United States Patent
Shin et al.

(10) Patent No.: US 10,789,033 B2
(45) Date of Patent: Sep. 29, 2020

(54) SYSTEM AND METHOD FOR PROVIDING WIDGET

(71) Applicant: SAMSUNG ELECTRONICS CO., LTD., Suwon-si, Gyeonggi-do (KR)

(72) Inventors: Jin-woo Shin, Suwon-si (KR); Chul-joo Kim, Suwon-si (KR); Ki-hyuck Shin, Yongin-si (KR); Sun-young Jeong, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 261 days.

(21) Appl. No.: 15/556,092

(22) PCT Filed: Mar. 30, 2016

(86) PCT No.: PCT/KR2016/003259
§ 371 (c)(1),
(2) Date: Sep. 6, 2017

(87) PCT Pub. No.: WO2016/159654
PCT Pub. Date: Oct. 6, 2016

(65) Prior Publication Data
US 2018/0267768 A1   Sep. 20, 2018

(30) Foreign Application Priority Data
Apr. 1, 2015  (KR) .................. 10-2015-0046193

(51) Int. Cl.
*G06F 3/14*       (2006.01)
*G06F 3/048*      (2013.01)
*G06F 40/106*     (2020.01)

(52) U.S. Cl.
CPC ............ *G06F 3/1454* (2013.01); *G06F 3/048* (2013.01); *G06F 3/14* (2013.01); *G06F 40/106* (2020.01)

(58) Field of Classification Search
CPC ...... G06F 3/1454; G06F 3/048; G06F 17/212; G06F 3/14
See application file for complete search history.

(56) References Cited

U.S. PATENT DOCUMENTS 8,954,489 B2      2/2015  Park et al.
9,513,802 B2 *   12/2016  Jang ................. G06F 3/0482
(Continued)

FOREIGN PATENT DOCUMENTS

| KR | 10-2010-0134495 | 12/2010 |
| KR | 10-2012-0122164 | 11/2012 |
| KR | 10-2013-0099733 | 9/2013 |

OTHER PUBLICATIONS

International Search Report for PCT/KR2016/003259, dated Jul. 6, 2016, 4 pages.

*Primary Examiner* — Shen Shiau
(74) *Attorney, Agent, or Firm* — Nixon & Vanderhye, P.C.

(57) ABSTRACT

Provided are a system and method of providing a widget. A device for providing a widget to at least one external device, includes: a communicator configured to enable a communication connection with the at least one external device; and a processor configured to register the widget to be provided to the at least one external device, generate visual data of the widget by using a layout of the widget as the device is connected to the at least one external device via the communication connection, and provide the generated visual data to the at least one external device, wherein the layout is used to display an execution screen of the registered widget on a screen of the device.

18 Claims, 22 Drawing Sheets

(56) References Cited

U.S. PATENT DOCUMENTS

| | | | |
|---|---|---|---|
| 9,648,099 B2* | 5/2017 | Lee | G06F 3/14 |
| 9,924,018 B2* | 3/2018 | Won | G06F 3/1462 |
| 10,089,053 B2* | 10/2018 | Gerlach | G06F 3/04817 |
| 10,136,248 B2* | 11/2018 | Kwon | H04W 4/029 |
| 10,439,838 B2* | 10/2019 | Kim | H04L 67/025 |
| 2007/0101297 A1* | 5/2007 | Forstall | G06F 3/0482 |
| | | | 715/841 |
| 2010/0262673 A1 | 10/2010 | Chang et al. | |
| 2011/0276911 A1* | 11/2011 | Choi | G06F 9/452 |
| | | | 715/769 |
| 2012/0023157 A1* | 1/2012 | Roth | H04L 67/306 |
| | | | 709/203 |
| 2012/0066411 A1 | 3/2012 | Jeide et al. | |
| 2012/0081299 A1* | 4/2012 | Xiao | H04N 21/42224 |
| | | | 345/173 |
| 2013/0227014 A1 | 8/2013 | Song | |
| 2014/0073359 A1 | 3/2014 | Issa et al. | |
| 2014/0189527 A1* | 7/2014 | Kruglick | G06F 9/451 |
| | | | 715/746 |
| 2014/0201803 A1* | 7/2014 | Patil | H04L 67/06 |
| | | | 726/1 |
| 2014/0223490 A1* | 8/2014 | Pan | G06F 3/1462 |
| | | | 725/61 |
| 2015/0355816 A1* | 12/2015 | Shim | G06F 3/04817 |
| | | | 715/745 |
| 2016/0188280 A1* | 6/2016 | Shim | G06F 3/0482 |
| | | | 345/2.2 |
| 2016/0216852 A1* | 7/2016 | Lee | H04N 21/8173 |
| 2016/0231872 A1* | 8/2016 | Tamura | G06F 3/048 |
| 2017/0235435 A1* | 8/2017 | Sohn | G06F 9/451 |
| | | | 715/738 |
| 2018/0248991 A1* | 8/2018 | Ryu | G06F 3/0346 |

\* cited by examiner

FIG. 11

| LAYOUT OF WIDGET BEING EXECUTED | VISUAL DATA IN HTML FORM |
|---|---|
| ```
<LinearLayout
xmlns:android="http://schemas.android.com/apk/res/android"
android:layout_width="match_parent"
android:layout_height="match_parent">
<LinearLayout
  android:layout_width="match_parent"
  android:layout_height="80dp">
  <ImageView
    android:layout_width="wrap_content"
    android:layout_height="wrap_content"
    android:padding="12dp" />
  <TextView
    android:layout_width="wrap_content"
    android:layout_height="wrap_content"
    android:textColor="#232323" />
</LinearLayout>
<FrameLayout
  android:layout_width="match_parent"
  android:layout_height="match_parent"
  android:background="#F8F8F8">
  <ListView
    android:layout_width="match_parent"
    android:layout_height="match_parent" />
</FrameLayout>
<Button
  android:layout_width="match_parent"
  android:layout_height="wrap_content"
  android:background="#F8F8F8"
  android:text="@string/refresh"
  android:textColor="#232323"
  android:textSize="14sp" />
</LinearLayout>
``` | ```
<div style="width:768px; height:576px">
<div style="width:768px; height:576px">
  <div style="width:736px; height:160px; padding:12px">
    <img style="width:736px; height:160px"
      src="data:image/png;base64,iVBORw0KGgoAAAANSUhEUgAAADiA..." /110
    />
    <span style="background-color:#F0F0F0; color:#232323">San
      Francisco</span>  112
  </div>
  <div style="width:736px; height:288px">
  </div>
  <button style="width:736px; height:96px; font-size:14px;
    color:#232323">Refresh</button>
</div>
</div>
``` |

SYSTEM AND METHOD FOR PROVIDING WIDGET

This application is the U.S. national phase of International Application No. PCT/KR2016/003259 filed 30 Mar. 2016, which designated the U.S. and claims priority to KR Patent Application No. 10-2015-0046193 filed 1 Apr. 2015, the entire contents of each of which are hereby incorporated by reference.

TECHNICAL FIELD

The present disclosure relates to a system and method for providing a widget, and more particularly, to a system and method for providing visual data, which is used to display an execution screen of a widget being executed on a device on another device, to the other device.

BACKGROUND AND SUMMARY

With advancements in network and multimedia technologies, a user may share an application by using multiple devices. However, when the user wants to share a widget application, which is executed on a device, with other devices, the user needs to share an installation file of the widget application or the entire screen of the device.

A method of using a remote desktop protocol (RDP) and virtual network computing (VNC) developed by Microsoft is used to remotely control an application shared among devices, and a method of directly transmitting control commands to a target device to control the target device (e.g., a remote control for home appliances) is used.

However, existing methods of sharing applications have some problems. According to a method of installing an application of a device on other devices and sharing the application, it may be difficult to install the application depending on operating systems (OSs) or resources of other devices. According to a method of controlling an application by sharing a screen, since multiple devices use an identical screen, the user may not be able to execute other applications while sharing the application. Moreover, content that the user does not want to share may be transmitted to other devices while sharing the application, and thus, it is difficult to protect the user's privacy.

Accordingly, there is a need for a technique that protects users' privacy and effectively provides a widget installed on a device to other devices in a short or remote distance regardless of OSs or resources of the other devices.

According to one or more embodiments, there is provided a widget sharing system for providing a widget installed on a device to other devices in a short or remote distance.

According to one or more embodiments, there is provided a widget sharing system for controlling a widget installed on a device according to user inputs from other devices.

According to one or more embodiments, there is provided a widget sharing system for transmitting, to other devices, a widget currently being executed as content in a completed form, such as images or text, and displaying the content on the other devices, thus effectively sharing the widget regardless of OSs or resources of the other devices.

According to one or more embodiments, there is provided a widget sharing system for effectively managing a device providing a widget, and other devices receiving the widget.

BRIEF DESCRIPTION OF THE DRAWINGS

FIG. 11 is a diagram of an example of visual data in an HTML form that is converted from a layout of a widget being executed on a device, according to some embodiments.

DETAILED DESCRIPTION OF EXAMPLE EMBODIMENTS

Figure 1:
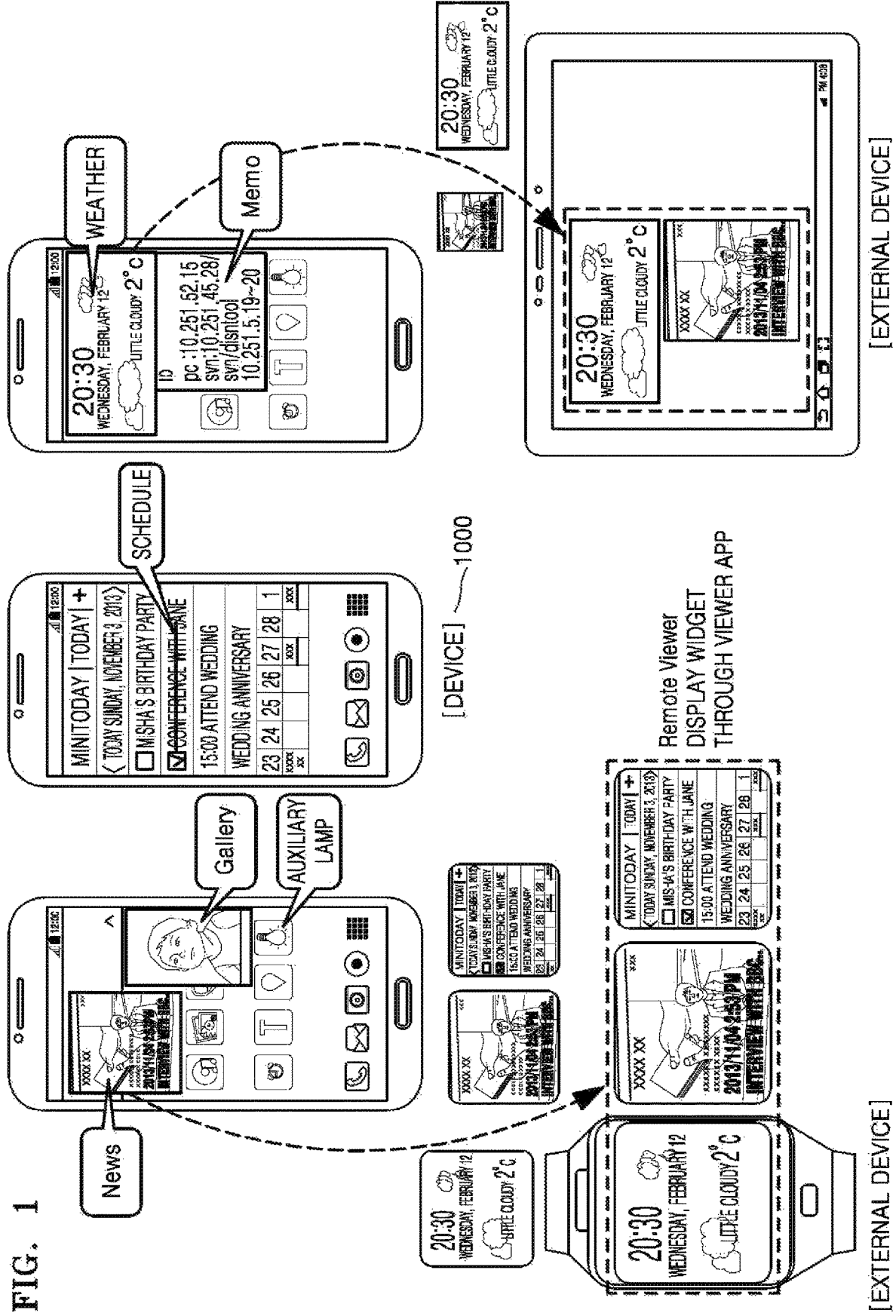
FIG. 1 is a diagram of an example of a widget sharing system according to some embodiments.

According to one or more embodiments, a device for providing a widget to at least one external device, includes: a communicator configured to enable a communication connection with the at least one external device; and a processor configured to register the widget to be provided to the at least one external device, generate visual data of the widget by using a layout of the widget as the device is connected to the at least one external device via the communication connection, and provide the generated visual data to the at least one external device, wherein the layout is used to display an execution screen of the registered widget on a screen of the device.

The processor may be further configured to map, to an identification value of the at least one external device, an identification value of the widget to be provided to the at least one external device.

The processor may be further configured to map, to the identification value of the at least one external device, some of regions of the execution screen of the widget to be provided to the at least one external device.

The visual data may be generated as at least one of an image file, a video file, and a text file, and the processor may be further configured to: determine a format of the visual data according to specifications of the at least one external device; and generate the visual data according to the determined format.

The layout of the widget, which is used to display the execution screen of the registered widget on the screen of the device, may be stored in a memory of the device before the execution screen of the widget is displayed on the screen of the device.

The processor may be further configured to generate the visual data of the widget by mapping, to at least one object written in a Markup language, the layout of the widget stored in the memory and all or some of pieces of data associated with the layout.

The processor may be further configured to: determine the layout of the visual data according to specifications of the at least one external device; and generate the visual data by editing the execution screen of the widget, according to the determined layout.

The processor may be further configured to: determine a format of the visual data according to a network connection method with the at least one external device; and generate the visual data according to the determined format.

The processor may be further configured to generate the visual data by capturing the execution screen of the widget which is to be displayed on the screen of the device.

The communicator may be further configured to: transmit, to the at least one external device, a list of widgets installed on the device as the communication connection with the at least one external device is enabled; and receive, from the at least one external device, an identification value of a widget selected from the list of widgets. The processor may be further configured to generate visual data of the widget that is selected on the at least one external device.

According to one or more embodiments, a method, performed by a device, of providing a widget to at least one external device, includes: registering the widget to be provided to the at least one external device; generating visual data of the widget by using a layout of the widget as a communication connection with the at least one external device is enabled, wherein the layout is used to display an execution screen of the registered widget on a screen of the device; and providing the generated visual data to the at least one external device.

In the registering of the widget, an identification value of the widget to be provided to the at least one external device may be mapped to an identification value of the at least one external device.

In the registering of the widget, some of regions of the execution screen of the widget to be provided to the at least one external device may be mapped to the identification value of the at least one external device.

The visual data may be generated as at least one of an image file, a video file, and a text file. In the generating of the visual data, a format of the visual data may be determined according to specifications of the at least one external device, and the visual data may be generated according to the determined format.

The layout of the widget, which is used to display the execution screen of the registered widget on the screen of the device, may be stored in a memory of the device before the execution screen of the widget is displayed on the screen of the device.

In the generating of the visual data, the visual data of the widget may be generated by mapping, to at least one object written in a Markup language, the layout of the widget that is stored in the memory and all or some of pieces of data associated with the layout.

In the generating of the visual data, the visual data may be generated by determining the layout of the visual data according to specifications of the at least one external device and editing the execution screen of the widget according to the determined layout.

According to one or more embodiments, a device for displaying an execution screen of a widget being executed on an external device, includes: a communicator configured to receive, from the external device, a list of widgets being executed on the external device as a communication connection with the external device is enabled; a processor configured to select a certain widget from the received list of widgets, send a request for visual data of the selected widget to the external device, and generate the execution screen of the widget based on the visual data in response to the request from the external device; and a display configured to display the generated execution screen.

The visual data may be generated by the external device based on a layout of the widget that is used to display the execution screen of the selected widget on a screen of the external device.

According to one or more embodiments, a non-transitory computer-readable recording medium has embodied thereon a program which, when executed by a computer, performs the above method.

MODE OF THE INVENTION

The present disclosure will now be described more fully with reference to the accompanying drawings, in which exemplary embodiments of the disclosure are shown. The present disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. In the drawings, portions that are not related to the description of the disclosure are omitted for clarity. Throughout the specification, like reference numerals in the drawings denote like elements.

It will be understood that when a region is referred to as being "connected to" another region, the region can be "directly connected to" the other region or "electrically connected" thereto with an intervening region therebetween. It will be further understood that the terms "comprise" and/or "comprising" used herein specify to the presence of stated features or components, but do not preclude the presence or addition of one or more other features or components.

In the present specification, the description that a device provides a widget to an external device may mean that a device does not provide an external device with an installation file of a widget application, but provides an external device with visual data indicating part of an execution screen or the entire execution screen of the widget.

The visual data is data used to indicate a graphical user interface (GUI) of part of an execution screen or the entire execution screen of a widget being executed on the device and may be data used by the external device to display part of the execution screen or the entire execution screen of the widget. The visual data may include, for example, at least one of an image file, a text file, and a video file. Also, the visual data of the widget may be, for example, data written in a Markup language (e.g., a Hyper Text Markup Language (HTML), an extensible markup language (XML), etc.). When the visual data is an image file, a text file, or a video file that indicates the execution screen of the widget, the external device may display, on a screen of the external device, the execution screen of the widget by reproducing the visual data without any change. When the visual data is a file written in the Markup language, the external device may store the file written in the Markup language in a memory of the external device and may use the file written in the Markup language so as to form the execution screen of the widget which is to be displayed on the screen of the external device.

Hereinafter, the present disclosure will be described more fully with reference to the accompanying drawings.

FIG. 1 is a diagram of an example of a widget sharing system according to some embodiments.

Referring to FIG. 1, the widget sharing system may include a device 1000 and an external device 2000. The device 1000 may establish a communication connection with the external device 2000 and may provide the external device 2000 with a widget being executed on the device 1000. The device 1000 may provide the external device 2000 with visual data indicating part of an execution screen or the entire execution screen of the widget. The execution screen of the widget may be an execution screen displayed on a screen of the device 1000 or an execution screen to be displayed thereon. For example, when the execution screen of the widget is an execution screen to be displayed on the screen of the device 1000, the widget may be in the process of being executed in a background of the device 1000.

Also, the visual data of the widget may not be a widget application and may be data indicating the execution screen of the widget. The visual data of the widget may be, for example, image data, text data, or video data of a GUI indicating part of the execution screen or the entire execution screen of the widget. In addition, the visual data of the widget may be, for example, layout data of the GUI. Moreover, the visual data of the widget may be, for example, data written in a Markup language (e.g., an HTML, an XML, etc.). However, the visual data is not limited thereto.

The device 1000 may register a widget to be provided to the external device 2000 in advance and may determine a format of the visual data to be provided to the external device 2000, according to specifications of the external device 2000. In addition, the external device 2000 may edit the execution screen of the widget according to the specifications of the external device 2000 and provide the edited execution screen to the external device 2000.

The external device 2000 may receive the visual data of the widget from the device 1000 and may display part of the execution screen or the entire execution screen of the widget on the screen of the external device 2000 based on the received visual data. When the external device 2000 receives visual data that is edited from the execution screen of the widget, the edited execution screen may be displayed on the screen of the external device 2000.

Also, the external device 2000 may receive a user input regarding the execution screen of the widget that is displayed on the screen of the external device 2000 and may provide the device 1000 with a value corresponding to the user input (for example, based on a type of a touch input, coordinates of a touch point, input text, etc.). In addition, the device 1000 may perform a certain function of the widget displayed on the screen of the external device 2000 according to the user input value received from the external device 2000, may update the execution screen of the widget, and may provide the external device 2000 with visual data regarding the updated execution screen.

The device 1000 and the external device 2000 may each be a smart phone, a tablet personal computer (PC), a PC, a smart television (TV), a mobile phone, a personal digital assistant (PDA), a laptop computer, a media player, a micro server, a device having a global positioning system (GPS), an e-book reader, a digital broadcast terminal, a navigation device, a kiosk, an MP3 player, a digital camera, home appliances, and other mobile or non-mobile computing devices. However, the device 1000 and the external device 2000 are not limited thereto. Also, the device 1000 and the external device 2000 may each be a wearable device, for example, a watch, glasses, a hair band, a ring, and the like, which has a communication function and a data processing function. However, the device 1000 and the external device 2000 are not limited thereto. The device 1000 and the external device 2000 may include all types of devices capable of providing and receiving a widget via a network.

The device 1000 and the external device 2000 may establish a communication connection with each other via a certain network. The network includes a Local Area Network (LAN), a Wide Area Network (WAN), a Value Added Network (VAN), a mobile radio communication network, a satellite communication network, and a combination thereof. The network is, in a broad sense, a data network via which components of each network illustrated in FIG. 1 actively communicate with each other, and may include wired Internet, wireless Internet, and a mobile wireless communication network.

Also, in the present specification, it has been described that the device 1000 is a host device that provides a widget and the external device 2000 is a client device that receives the widget. However, the present disclosure is not limited thereto. The external device 2000 may provide a widget to the device 1000, and the device 1000 may receive the widget from the external device 2000.

Figure 2:
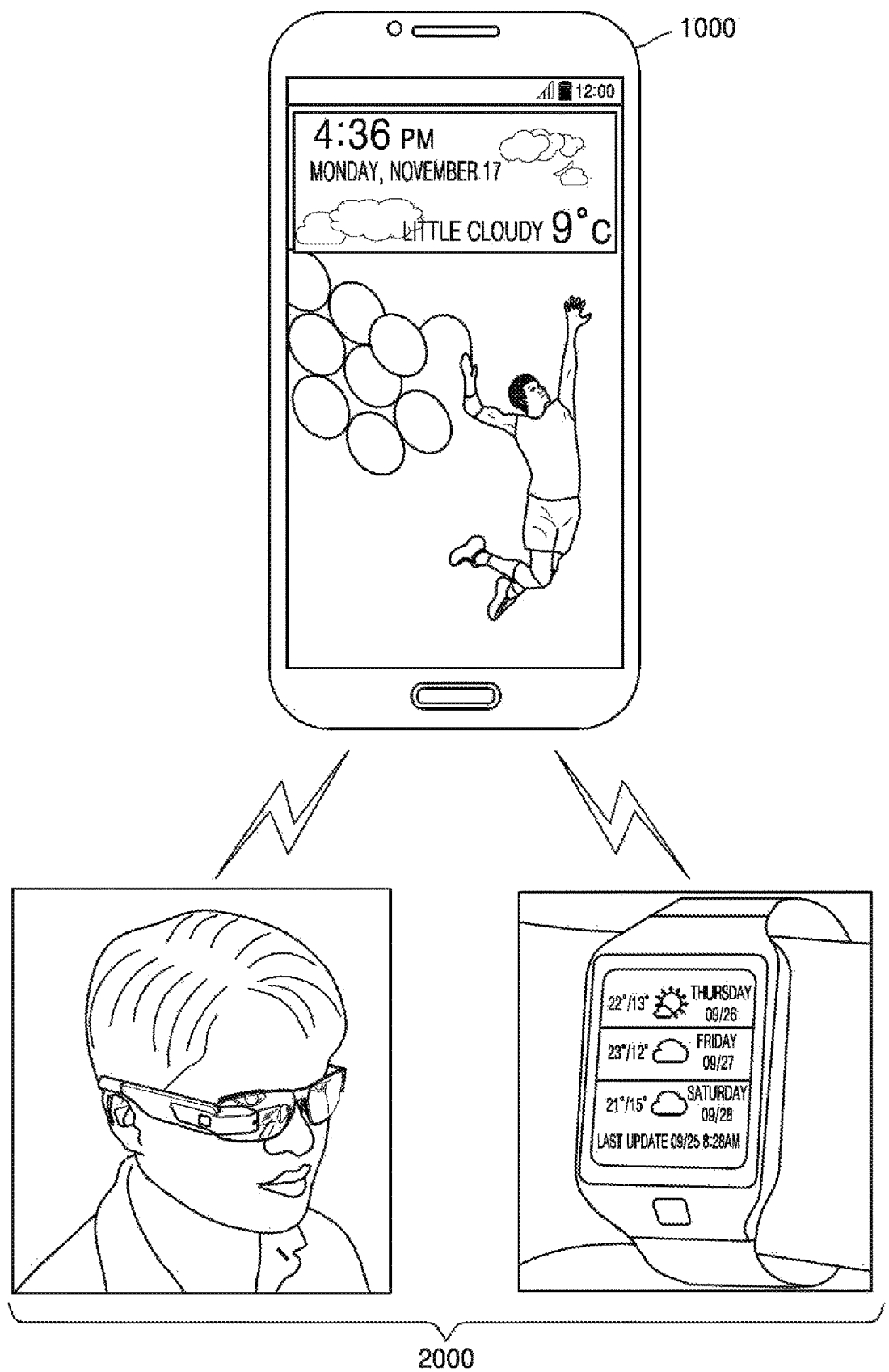
FIGS. 2 and 3 are diagrams of examples of connection relationships between a device and an external device within a widget sharing system, according to some embodiments.
Figure 3:
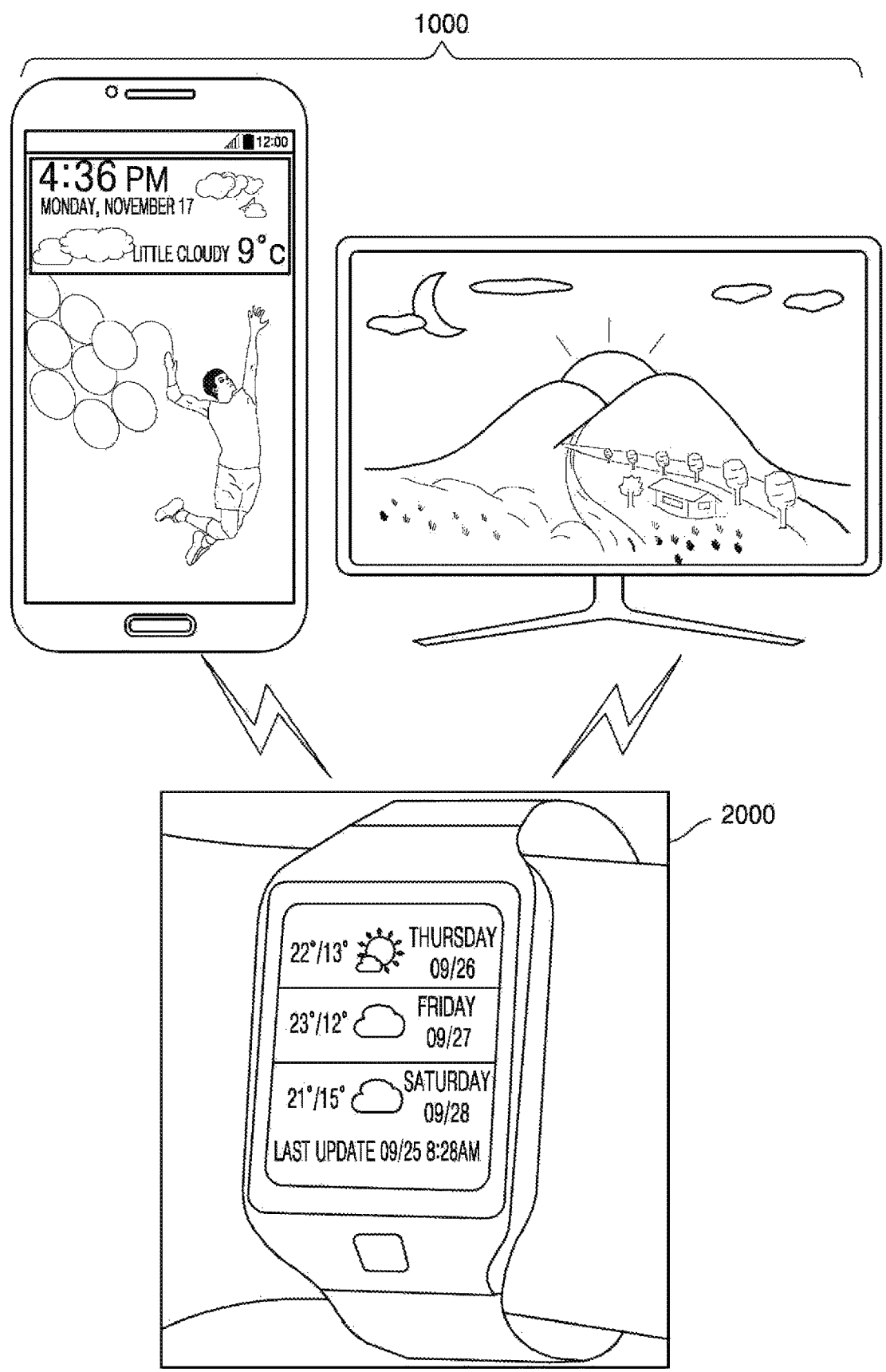

FIGS. 2 and 3 are diagrams of examples of connection relationships between the device 1000 and the external device 2000 within the widget sharing system, according to some embodiments.

Referring to FIG. 2, one device 1000 may be connected to multiple external devices 2000 and may provide a widget to each external device 2000. Also, referring to FIG. 3, multiple devices 1000 may be connected to one external device 2000, and the external device 2000 may receive a widget from each device 1000.

Figure 4:
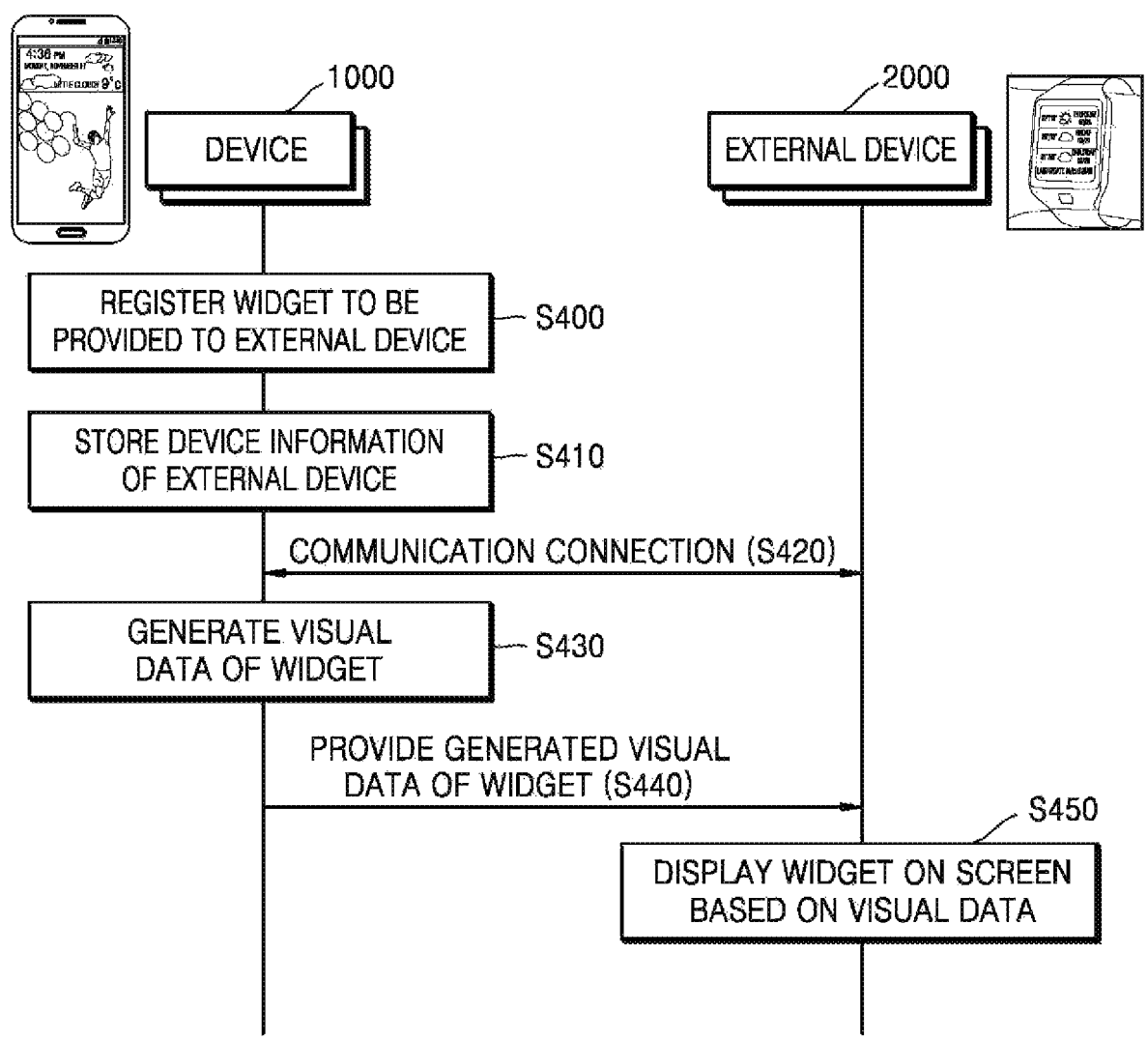
FIG. 4 is a flowchart of a method by which a device provides a widget to an external device, according to some embodiments.

FIG. 4 is a flowchart of a method by which the device 1000 provides a widget to the external device 2000, according to some embodiments.

In operation S400, the device 1000 may register a widget to be provided to the external device 2000. The device 1000 may select the registered widget from a list installed on the device 1000 and may select the external device 2000 to which the selected widget is to be provided, thereby registering the widget to be provided to the external device 2000 in a memory of the device 1000. The device 1000 may select all or some regions of the execution screen of the widget and may map the selected regions of the execution screen of the widget to the external device 2000. The device 1000 may set a format of the visual data of the widget to be provided to the external device 2000. Also, the device 1000 may set authority of the user of the widget or authority of the external device 2000. The device 1000 may set a widget and a certain function of the widget that the external device 2000 or the user of the device 1000 may use. The method by which the device 1000 registers the widget to be provided to the external device 2000 will be described in more detail with reference to FIGS. 6 and 7.

In operation S410, the device 1000 may store device information of the external device 2000. Device information may include, for example, a model name, a type, functions, a screen resolution, a processor, an operating system (OS), and a communication method of a device. The device 1000 may receive the device information of the external device 2000 from the external device 2000. However, the present disclosure is not limited thereto. The device 1000 may receive the device information of the external device 2000 from a separate server (not shown).

In operation S420, the device 1000 may establish a communication connection with the external device 2000. The device 1000 may be connected to the external device 2000 via short distance communication, when the device 1000 comes sufficiently close to the external device 2000, that is, to within a certain communication coverage range. However, the present disclosure is not limited thereto. The device 1000 may be connected to the external device 2000 using various communication methods.

In operation S430, the device 1000 may generate visual data of the widget. The device 1000 may generate visual data corresponding to a selected region of the execution screen of the widget. Before displaying the execution screen of the widget on the screen of the device 1000, the device 1000 may generate the visual data based on screen information of the execution screen of the widget, the information being stored in a memory of the device 1000.

For example, the device 1000 may extract a layout and data of a widget application which are stored in the memory of the device 1000 and may generate visual data to be provided to the external device 2000 based on the extracted layout and data. In this case, the device 1000 may extract, from the layout and data extracted from the memory, significant characteristics corresponding to the selected region of the execution screen of the widget and may generate visual data in an HTML form by mapping the extracted characteristics to an HTML object.

Also, the device 1000 may edit the layout of the widget application or change a format of the visual data, according to specifications of the external device 2000. In addition, the device 1000 may change the format of the visual data according to a communication method of the device 1000 and the external device 2000. The visual data may include, for example, formats of an image file, a text file, and a video file. However, the visual data is not limited thereto.

The method of generating the visual data, performed by the device 1000, and the generated visual data will be described in more detail with reference to FIGS. 8 to 12.

In operation S440, the device 1000 may provide the generated visual data to the external device 2000. The device 1000 may provide the generated visual data to the external device 2000 in response to a request from the external device 2000. However, the present disclosure is not limited thereto. The device 1000 may make the external device 2000 receive the generated visual data even when not requested by the external device 2000.

The device 1000 may provide the visual data of the widget to the external device 2000 in a predefined cycle. Also, as the execution screen of the widget being executed on the device 1000 is updated, the device 1000 may provide the external device 2000 with visual data indicating the updated execution screen.

In operation S450, the external device 2000 may display the execution screen of the widget on the screen of the external device 2000 based on the visual data. When the visual data of the widget is an image file, a text file, and a video file that indicate the execution screen of the widget, the external device 2000 may display, on the screen of the external device 2000, the visual data of the widget which is received from the device 1000 without any change. Alternatively, when the visual data of the widget is an HTML file, the external device 2000 may translate the HTML file and thus may display the execution screen of the widget on the screen of the external device 2000. However, the present disclosure is not limited thereto.

Figure 5:
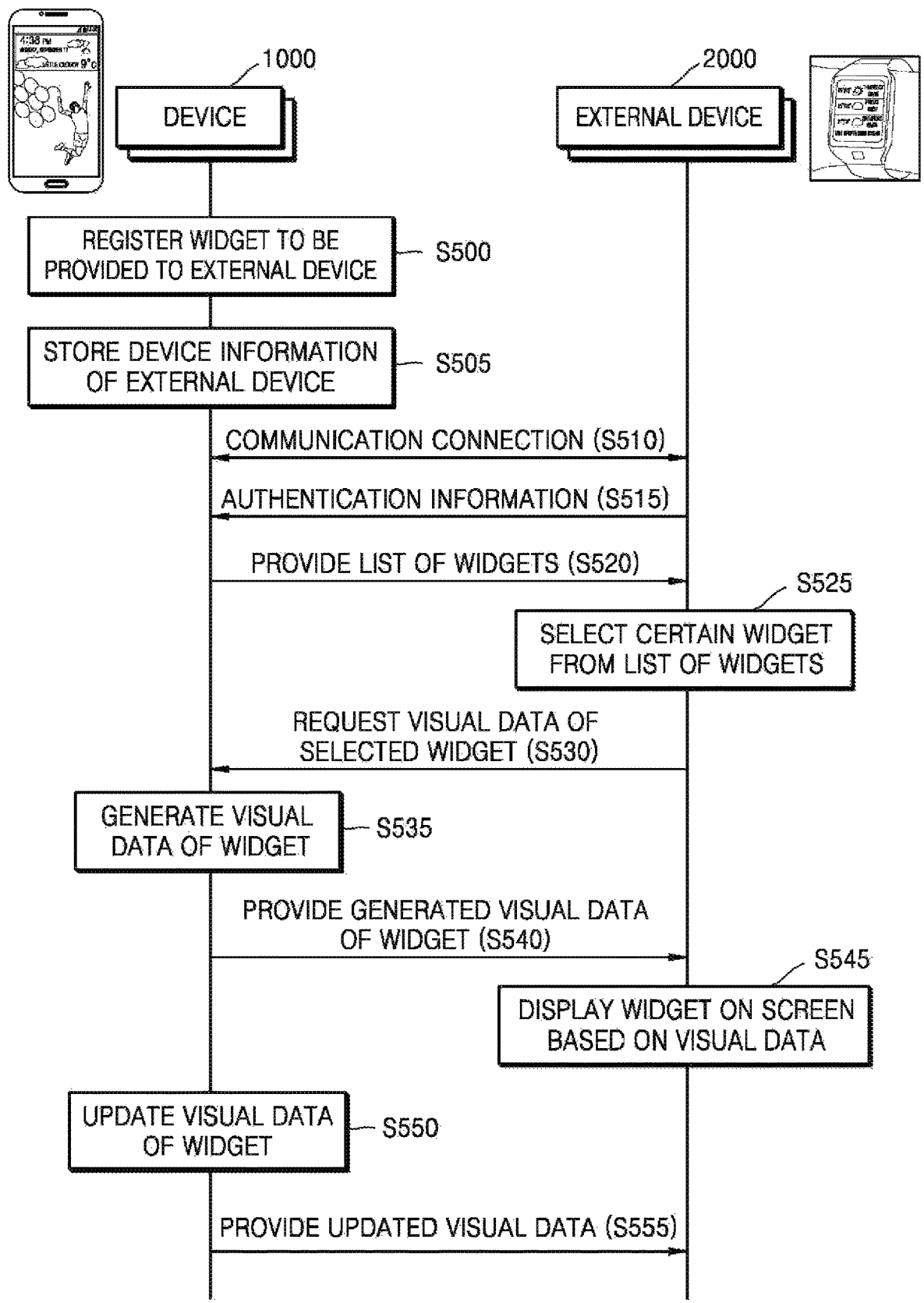
FIG. 5 is a flowchart of a method by which a device provides an external device with a list of widgets and an execution screen of a widget selected by the external device, according to some embodiments.

FIG. 5 is a flowchart of a method by which the device 1000 provides the external device 2000 with a list of widgets and an execution screen of a widget selected by the external device 2000, according to some embodiments.

Operations S500 to S510 respectively correspond to operations S400 to S420, and thus detailed descriptions thereof will be omitted for convenience of explanation.

In operation S515, the external device 2000 may provide the device 1000 with authentication information of the external device 2000. The external device 2000 may provide the device 1000 with, for example, identification values of the device 1000 and the external device 2000. Also, the external device 2000 may provide the device 1000 with, for example, passwords and a key value. However, the present disclosure is not limited thereto.

In operation S520, the device 1000 may provide the list of widgets to the external device 2000. The device 1000 may authenticate the external device 2000 or a user of the external device 2000 based on the authentication information received from the external device 2000. Also, as the external device 2000 or the user of the external device 2000 is authenticated, the device 1000 may provide the external device 2000 with the list of widgets that the external device 2000 may use.

In operation S525, the external device 2000 may select a certain widget from the list of widgets. The external device 2000 may display the list of widgets on the screen of the external device 2000 and may select the certain widget from the displayed list of widgets according to a user selection input from the external device 2000.

In operation S530, the external device 2000 may send a request for visual data of the selected widget to the device 1000. The external device 2000 may provide the device 1000 with an identification value of the selected widget and thus may send the request for the visual data of the selected widget to the device 1000.

Operations S535 to S545 respectively correspond to operations S430 to S450, and thus detailed descriptions thereof will be omitted.

In operation S550, the device 1000 may update the visual data of the widget. The device 1000 may update the execution screen of the widget by performing a certain function of the widget based on a user input regarding the widget being executed on the device 1000. Also, as the execution screen of the widget is updated, the visual data of the widget to be provided to the external device 2000 may be updated.

In operation S555, the device 1000 may provide the external device 2000 with the updated visual data. The device 1000 may make the external device 2000 receive the updated visual data even when not requested by the external device 2000.

Figure 6:
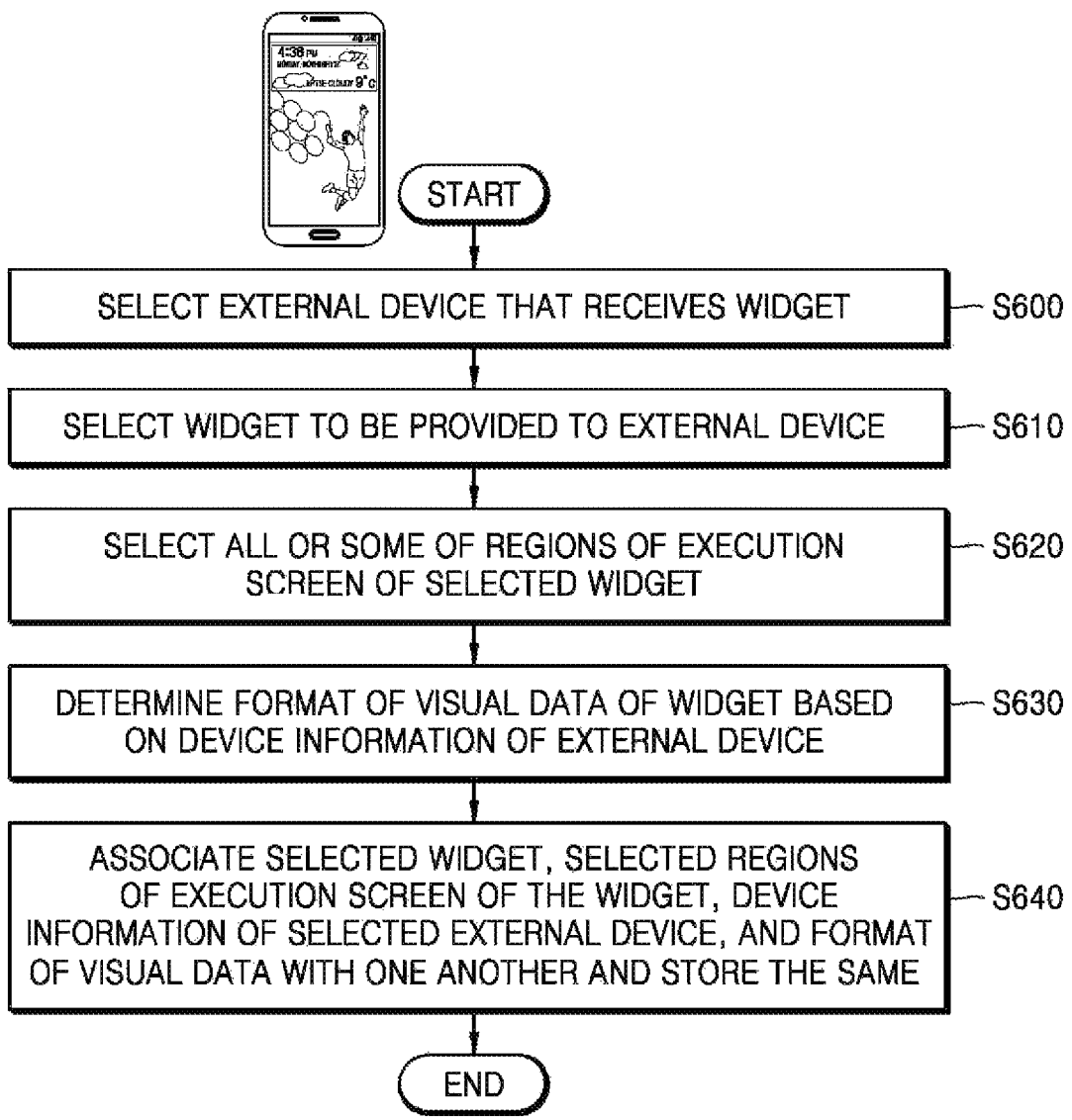
FIG. 6 is a flowchart of a method by which a device registers a widget, according to some embodiments.

FIG. 6 is a flowchart of a method by which the device 1000 registers the widget, according to some embodiments.

In operation S600, the device 1000 may select an external device 2000 that may receive the widget. The device 1000 may display a list of external devices 2000 on the screen of the display 1000 and may select an external device 2000 according to a user selection input. The external device 2000 may be another device of the user of the device 1000 or a device of another user.

Also, the device 1000 may select the external device 2000 by inputting an identification value of the external device 2000. In this case, the user of the device 1000 may input the identification value of the external device 2000 to the device 1000 by using a certain input tool. However, the present disclosure is not limited thereto. When the user of the device 1000 allows the external device 2000 to come close to a communication coverage range of the device 1000, the identification value of the external device 2000 is transmitted from the external device 2000 to the device 1000, and the device 1000 may display the identification value of the external device 2000 on the screen of the device 1000. In this case, the user may select the identification value of the external device 2000 that is displayed on the screen of the device 1000 and thus may select the external device 2000.

In operation S610, the device 1000 may select the widget to be provided to the external device 2000. The device 1000 may display the list of widgets installed on the device 1000 on the screen of the device 1000 and may select the widget to be provided to the external device 2000 according to a user selection input.

In this case, the device 1000 may recommend, to the user of the device 1000, a widget that may be appropriately displayed on the external device 2000 according to specifications of the external device 2000. For example, based on a screen resolution of the external device 2000, the device 1000 may recommend the widget, which may be appropriately displayed on the screen of the external device 2000, to the user of the device 1000. Also, for example, according to a type of a network established between the device 1000 and the external device 2000, the device 1000 may recommend a widget, which may be smoothly provided to the external device 2000, to the user of the device 1000. In addition, for example, according to a type of an OS of the external device 2000, the device 1000 may recommend a widget, which may be provided to the external device 2000, to the user of the device 1000.

Moreover, the device 1000 may recommend a widget to the user of the device 1000 based on the authority of the external device 2000 or authority of the user of the external device 2000. For example, the device 1000 may select a widget from among the widgets installed on the device 1000 and may recommend the selected widget to the user of the device 1000, wherein the selected widget has authority used by the external device 2000 or the user of the external device 2000.

In operation S620, the device 1000 may select all or some regions of the execution screen of the selected widget. The device 1000 may receive a user input for selecting all or some of the regions of the execution screen of the selected widget and may select all or some of the regions of the execution screen according to the received user input. For example, the user of the device 1000 may select all or some of the regions of the execution screen of the widget through a touch & drag input.

In operation S630, the device 1000 may determine a format of the visual data of the widget based on the device information of the external device 2000. The device 1000 may identify the OS of the external device 2000 and may determine a format that the OS of the external device 2000 supports as the format of the visual data of the widget that is to be provided to the external device 2000.

Also, the device 1000 may determine, as the format of the visual data of the widget to be provided to the external device 2000, a format of at least one of an image file, a text file, and a video file. In this case, according to at least one of a type, a function, a screen resolution, a screen size, a processor, and a communication method of the external device 2000, the format of the visual data of the widget may be determined.

For example, when the screen size or screen resolution of the external device 2000 has a value smaller than a certain threshold value, the device 1000 may be set to provide visual data in a text form to the external device 2000. Also, for example, when the screen size or screen resolution of the external device 2000 has a value greater than the certain threshold value, the device 1000 may be set to provide visual data in an image or video form to the external device 2000.

For example, when performance of the processor of the external device 2000 has a value smaller than a first threshold value, the device 1000 may be set to provide the visual data in a text form to the external device 2000. Also, for example, when the performance of the processor of the external device 2000 has a value greater than the first threshold value but smaller than a second threshold value, the device 1000 may be set to provide the visual data in an image form to the external device 2000. In addition, for example, when the performance of the processor of the external device 2000 has a value greater than the second threshold, the device 1000 may be set to provide the visual data in a video form to the external device 2000.

For example, when the device 1000 and the external device 2000 are connected to each other via Bluetooth communication, the device 1000 may be set to provide the external device 2000 with the visual data in a text form. Also, when device 1000 and the external device 2000 are connected to each other via Wi-Fi communication, the device 1000 may be set to provide the external device 2000 with the visual data in an image or video form. However, the present disclosure is not limited thereto. Depending on a communication method used between the device 1000 and the external device 2000, formats of visual data may vary.

In operation S640, the device 1000 may associate the selected widget, the selected region of the execution screen of the widget, the device information of the selected external device 2000, and the format of the visual data with one another and may store the same. For each external device 2000, the device 1000 may map thereto the widget selected to be provided to the external device 2000, the selected region of the execution screen of the widget, the device information of the external device 2000, and the format of the visual data.

Figure 7:
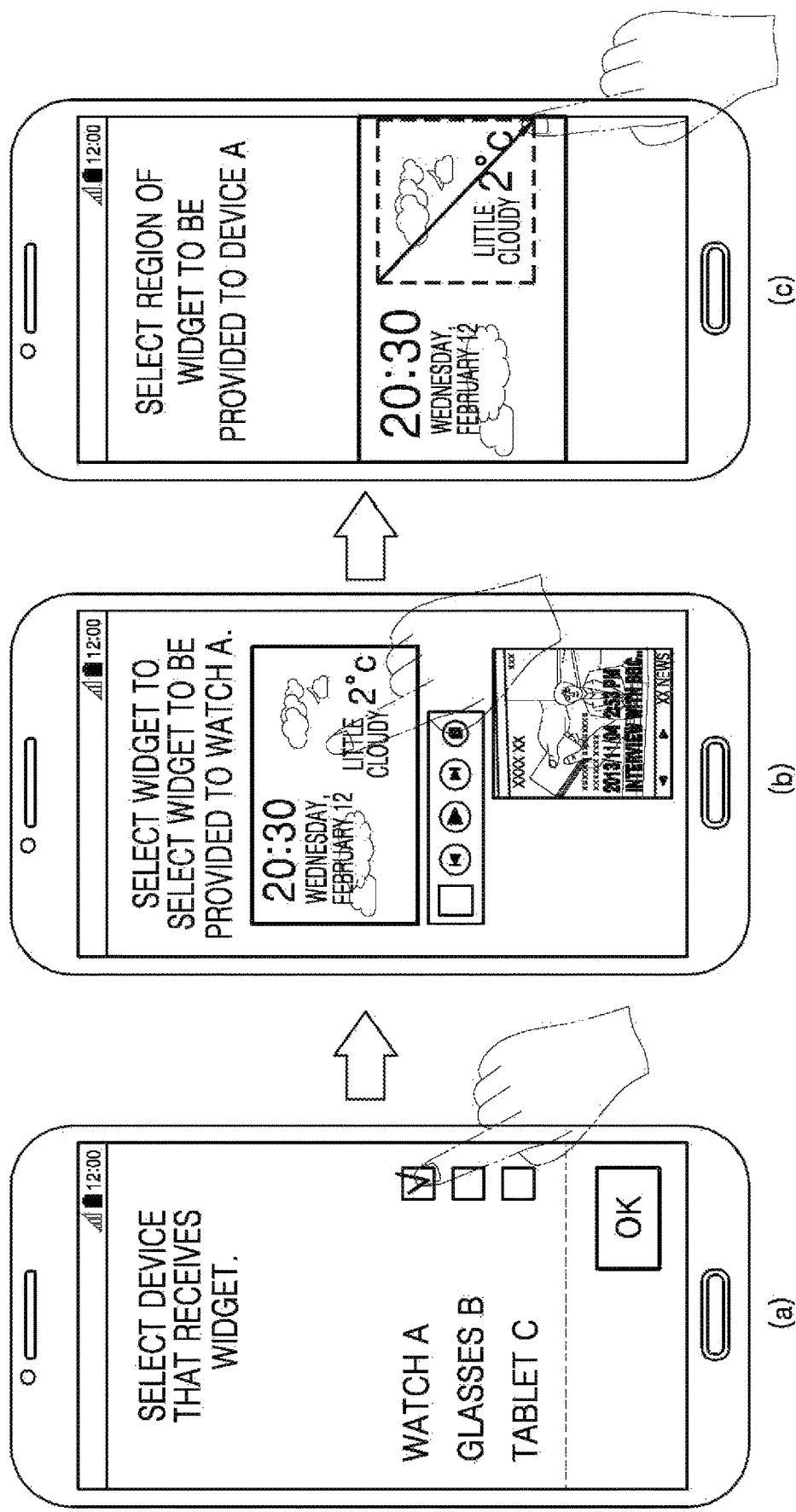
FIG. 7 is a diagram of an example in which a device registers a widget, according to some embodiments.

FIG. 7 is a diagram of an example in which the device 1000 registers the widget, according to some embodiments.

Referring to FIG. 7(*a*), the device 1000 may display, on the screen of the device 1000, the list of external devices 2000 that may receive a widget. When a certain user input is made on the device 1000, the device 1000 may display the list of the external devices 2000. For example, a list including "watch A", "glasses B", and "tablet C" is displayed on the screen of the device 1000. However, the list is not limited thereto. For example, user information of the external device 2000, the device information of the external device 2000, etc. may be displayed within the list of the external devices 2000. In addition, the user of the device 1000 may select, for example, the "watch A" from the list of the external devices 2000.

Referring to FIG. 7(*b*), as the user of the device 1000 selects the "watch A", the list of widgets that allows the user to select the widget to be provided to the "watch A" may be displayed on the screen of the device 1000. For example, execution screens of widgets installed on the device 1000 may be included in the list of the widgets. Also, the device 1000 may recommend a widget appropriate for the "watch A" based on specifications of the "watch A". Also, for example, the user of the device 1000 may select a weather widget.

Referring to FIG. 7(*c*), as the weather widget is selected, the device 1000 may display, on the screen of the device 1000, a GUI for selecting a region of the execution screen of the weather widget, the region being provided to the "watch A". The user of the device 1000 may select a certain region of the execution screen of the widget through, for example, a touch & drag input.

Accordingly, the device 1000 may generate a setting whereby the visual data regarding the selected region from the weather widget may be provided to the "watch A".

Figure 8:
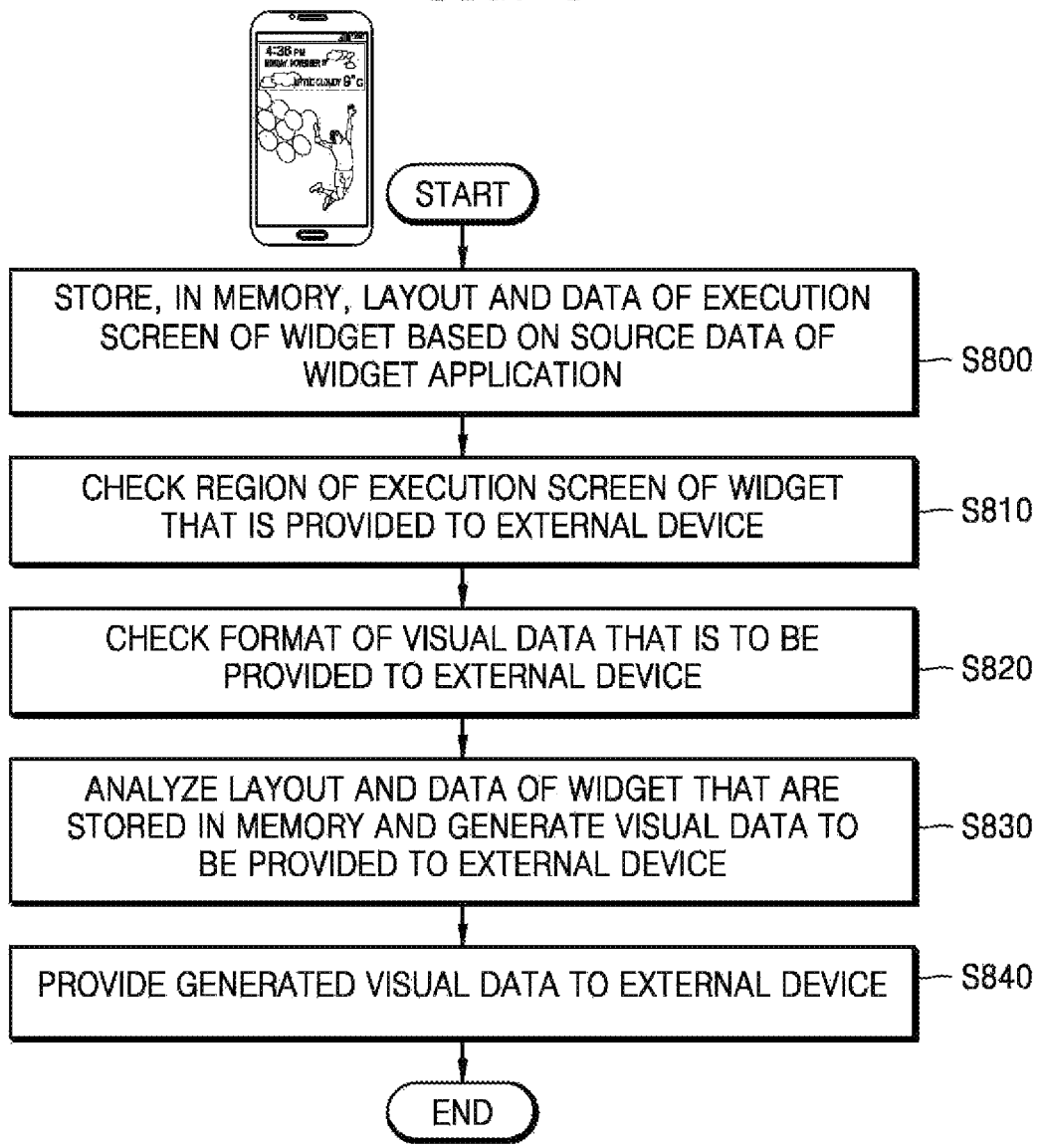
FIG. 8 is a flowchart of a method by which a device generates visual data of a widget, according to some embodiments.

FIG. 8 is a flowchart of a method by which the device 1000 generates the visual data of the widget, according to some embodiments.

In operation S800, the device 1000 may store, in the memory, a layout and data of an execution screen of the widget based on source data of a widget application. Before displaying the execution screen of the widget on the screen of the device 1000, the device 1000 may store the layout and data of the execution screen of the widget in the memory. Also, the device 1000 may draw the execution screen of the widget on a frame buffer based on the layout and data of the execution screen which are stored in the memory and thus may display the execution screen of the widget on the screen of the device 1000. The source data of the widget application may be, for example, data in an HTML form, but is not limited thereto. Also, the device 1000 may analyze the layout and data of the execution screen of the widget and use the analyzed layout and data so as to generate the visual data to be provided to the external device 2000.

In operation S810, the device 1000 may check a region of the execution screen of the widget, the region being expected to be provided to the external device 2000. The region to be provided to the external device 2000 may be all or some regions of the execution screen of the widget. The device 1000 may extract registration information of the widget from the memory and may check a region that is mapped to the external device 2000, based on the extracted registration information. The registration information may include, for example, setting values with regard to information regarding which region of the execution screen has to be provided to the external device 2000 when the widget is provided to the external device 2000.

In operation S820, the device 1000 may check a format of the visual data to be provided to the external device 2000. The device 1000 may extract the registration information of the widget from the memory and may check the format of the visual data that is to be provided to the external device 2000 based on the extracted registration information. The registration information may include, for example, setting values regarding which format of visual data has to be provided to the external device 2000. Also, the format of the visual data may vary depending on a state of the external device 2000. The device 1000 may select at least one form of an image form, a video form, and a text form, according to, for example, a network state of the external device 2000, available resources of the external device 2000, a type of an application that is being currently executed on the external device 2000, and the like. In this case, the device 1000 may receive information regarding a current state of the external device 2000 from the external device 2000 and may determine the format of the visual data based on the received information.

In operation S830, the device 1000 may analyze the layout and data of the widget that are stored in the memory and may generate the visual data to be provided to the external device 2000. The device 1000 may identify a layout and data which correspond to the region checked in operation S810 from among layouts and pieces of data of the widget. Also, the device 1000 may generate visual data in an HTML form based on the identified layout and data. In this case, the device 1000 may generate the visual data having the same structure as the layout of the widget being executed on the device 1000. However, the present disclosure is not limited thereto. The device 1000 may edit the layout of the widget being executed on the device 1000 and may generate the visual data having the structure of the edited layout. In this case, according to the identification value, the type, the screen resolution, etc. of the external device 2000, information regarding how to edit the layout of the widget may be set in advance. Also, the visual data in the HTML form may be provided to the external device 2000 and may be displayed on the screen of the external device 2000 as visual data in an image form, a video form, or a text form. The method by which the device 1000 generates the visual data of the widget will be described in more detail with reference to FIGS. 9 to 11.

It has been described that the device 1000 analyzes the layout and data of the widget and generates the visual data in the HTML form. However, the present disclosure is not limited thereto. The device 1000 may generate an image file or a video file by capturing the entire execution screen or part of the execution screen of the widget being executed on the device 1000.

In operation S840, the device 1000 may provide the generated visual data to the external device 2000. The device 1000 may provide the generated visual data to the external device 2000 in a predefined cycle, or when the visual data is updated, the device 1000 may provide the updated visual data to the external device 2000. However, the present disclosure is not limited thereto.

Figure 9:
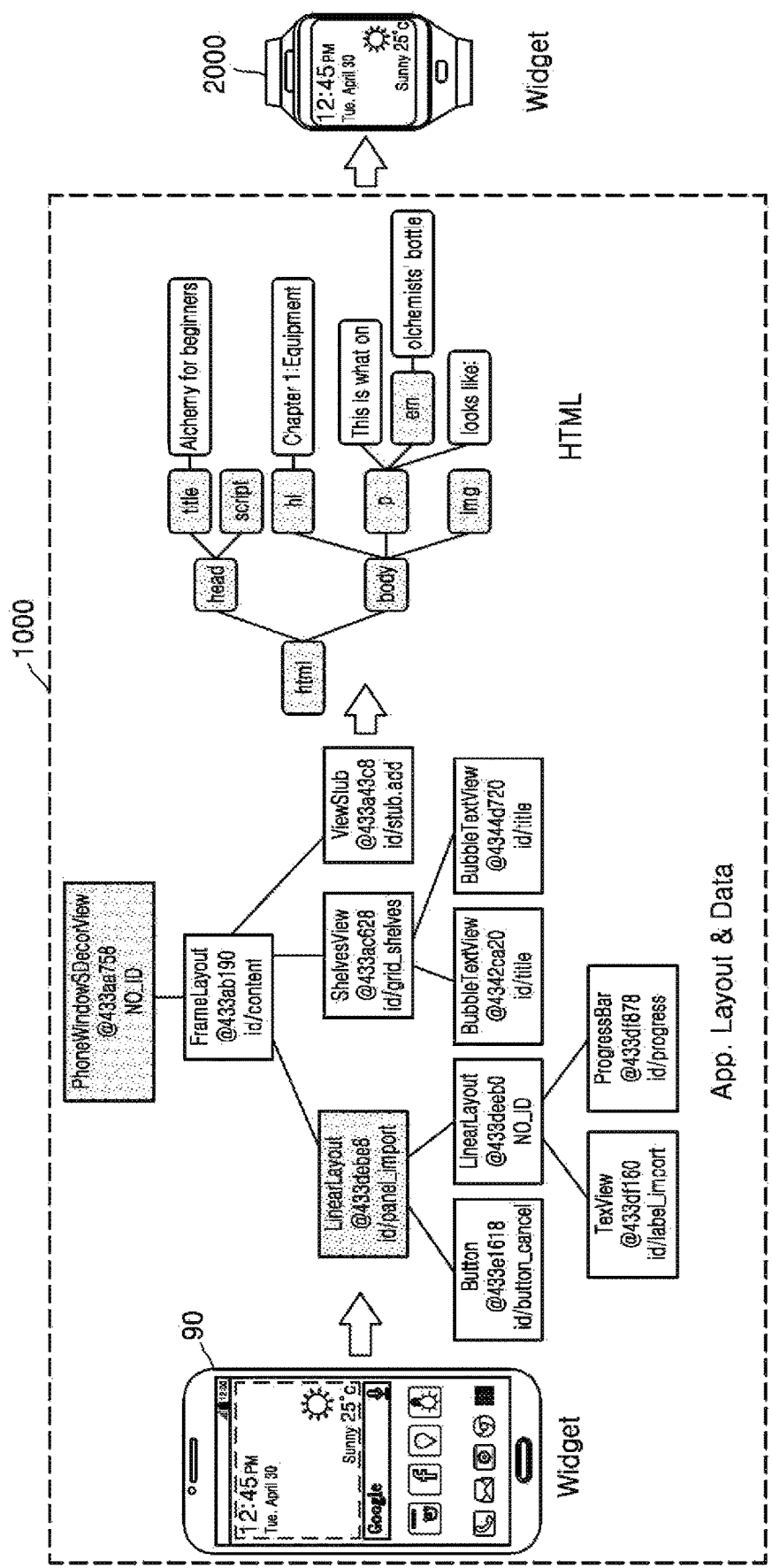
FIG. 9 is a diagram of an example in which a device generates visual data of a widget and transmits the generated visual data to an external device, according to some embodiments.

FIG. 9 is a diagram of an example in which the device 1000 generates the visual data of the widget and transmits the generated visual data to the external device 2000, according to some embodiments.

Referring to FIG. 9, the device 1000 may display an execution screen 90 of the widget on the screen of the device

1000. Before displaying the execution screen 90 of the widget, the device 1000 may store, in the memory of the device 1000, the layout and data that form the execution screen 90 of a widget application, and may draw an image to be displayed on the screen of the device 1000 based on the stored layout and data. In this case, the data forming the execution screen 90 of the widget application may include fixed values as well as values dynamically changing. The values dynamically changing may be, for example, values, which are collected in real time from the outside of the device 1000, and values changing according to a user input from the device 1000. However, the values are not limited thereto.

Also, the device 1000 may generate the visual data of the widget that is transmitted to the external device 2000 based on the layout and data that are stored in the memory and form the execution screen of the widget application. For example, the device 1000 may generate the visual data of the widget in an HTML form. In this case, the device 1000 may extract an object and data, which are necessary to generate the visual data of the widget from among objects and pieces of data that form the execution screen of the widget application, and may generate the visual data in an HTML form based on the extracted object and data.

In addition, the device 1000 may transmit the generated visual data to the external device 2000, and the external device 2000 may display, on the screen of the external device 2000, an execution screen of the widget based on the received visual data.

Referring to FIG. 9, it has been described that the device 1000 generates the visual data of the widget in an HTML form, but the present disclosure is not limited thereto. The device 1000 may generate the visual data of the widget as an image file or a video file, and in this case, the external device 2000 may directly reproduce the image or video file received from the device 1000.

Figure 10:
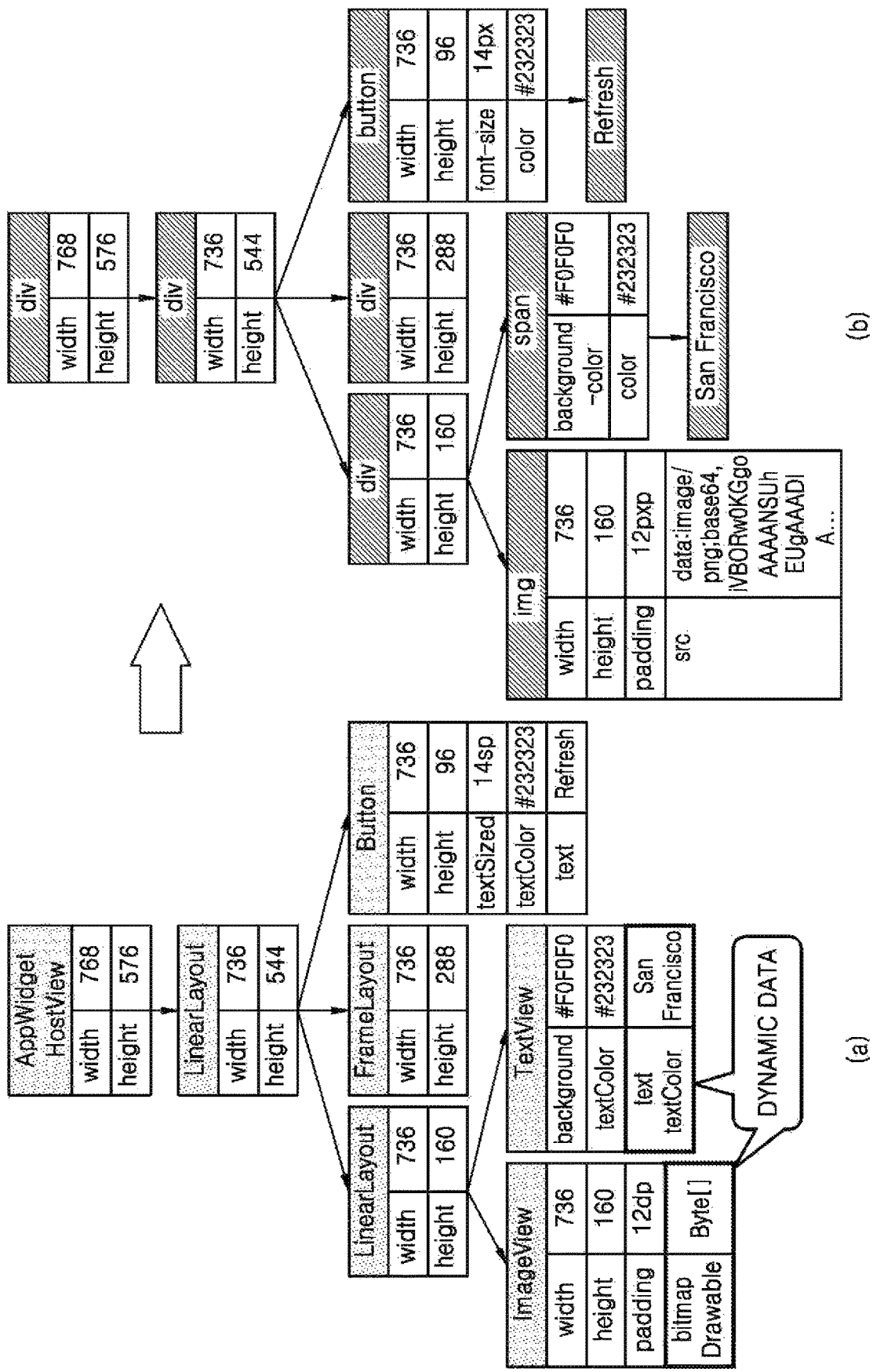
FIG. 10 is a diagram of an example in which a device generates visual data of a widget that is in a Hyper Text Markup Language (HTML) form, according to some embodiments.

FIG. 10 is a diagram of an example in which the device 1000 generates the visual data of the widget that is in an HTML form, according to some embodiments. FIG. 10(*a*) indicates an example of a layout and data that are stored in the memory of the device 1000 and form the execution screen of the widget. FIG. 10(*b*) indicates an example of the visual data of the widget that is provided to the external device 2000 and is in an HTML form.

Referring to FIG. 10(*a*), before the execution screen of the widget being executed on the device 1000 is displayed on the screen of the device 1000, the layout and data that form the execution screen of the widget as indicated by FIG. 10(*b*) may be stored in the memory of the device 1000. With regard to the layout and data that form the execution screen of the widget, the data may have fixed values as well as values that are dynamically updated. Also, the device 1000 may store an image, which is to be displayed on the screen of the device 1000 based on the layout and data that are stored in the memory, in a frame buffer of the device 1000 and thus may display the execution screen of the widget on the screen of the device 1000.

Referring to FIG. 10(*b*), the device 1000 may generate the visual data of the widget, which is to be provided to the external device 2000, in an HTML form as indicated by FIG. 10(*b*), based on the layout and data indicated by FIG. 10(*a*).

The device 1000 may analyze the layout and data that form the execution screen of the widget and thus may allow an execution screen, which is the same as or similar to the execution screen of the widget being executed on the device 1000, to be displayed on the screen of the external device 2000. For example, the device 1000 may analyze a structure of the layout forming the execution screen of the widget, objects included in the layout, a relationship between the objects, and characteristics of the objects and may map some or all of the objects included in the layout to HTML objects, thereby generating the visual data in an HTML form. Also, the objects may include "AppWidgetHostView", "LinearLayout", "FrameLayout", "Button", "ImageView", "TextView", and the like within the layout forming the execution screen of the widget, and the characteristics of the objects may include widths of the objects, heights of the objects, a size of text to be displayed within the objects, colors of the objects, and the like. However, the present disclosure is not limited thereto.

Moreover, the device 1000 may select some of the objects within the layout forming the execution screen of the widget being executed on the device 1000 and may change the characteristics of the selected objects, thereby editing the execution screen of the widget. Furthermore, the device 1000 may map objects having the changed characteristics to HTML objects and thus may generate visual data used to display the edited execution screen on the screen of the external device 2000.

FIG. 11 is a diagram of an example of visual data in an HTML form that is converted from the layout of the widget being executed on the device 1000, according to some embodiments.

Referring to FIG. 11, the device 1000 may analyze the layout of the widget being executed on the device 1000, the layout being illustrated on the left side of FIG. 11. The device 1000 may generate the visual data in an HTML form which is illustrated on the right side of FIG. 11. Also, as some pieces 110 and 112 of the visual data in an HTML form are dynamically changed, the visual data in an HTML form may be updated.

Figure 12:
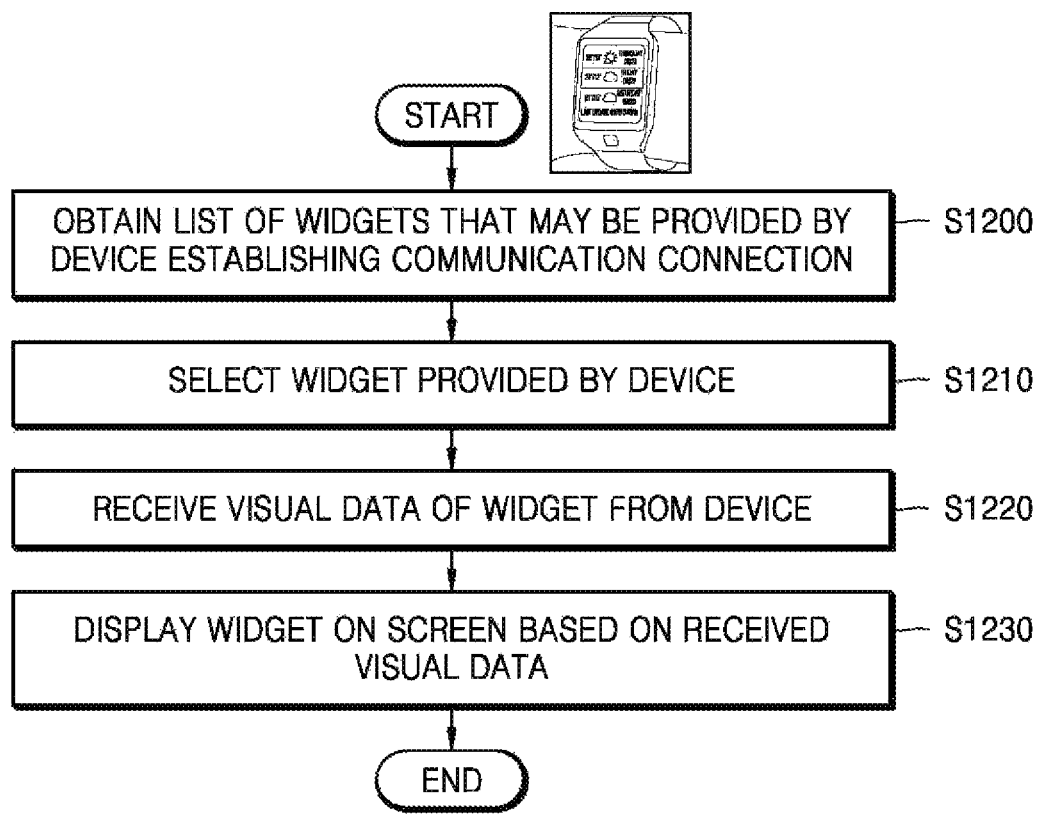
FIG. 12 is a flowchart of a method by which an external device receives and displays a widget, according to some embodiments.

FIG. 12 is a flowchart of a method by which the external device 2000 receives and displays the widget, according to some embodiments.

In operation S1200, the external device 2000 may obtain a list of widgets that may be provided by the device 1000 establishing a communication connection with the external device 2000. As the external device 2000 comes close to the device 1000 and within a communication coverage range, the external device 2000 may establish the communication connection with the device 1000 and may receive the list of widgets from the device 1000, the list being set in advance.

In operation S1210, the external device 2000 may select a widget that may be provided by the device 1000. The external device 2000 may display, on the screen of the external device 2000, the list of widgets that is received from the device 1000 and may select a certain widget from the displayed list of widgets, based on a user selection input.

In operation S1220, the external device 2000 may receive visual data of the selected widget from the device 1000. For example, the external device 2000 may receive visual data in an HTML form from the device 1000. In this case, the device 1000 may generate the visual data of the selected widget in a certain form based on an identification value of the external device 2000 and an identification value of the widget selected by the external device 2000 and may provide the generated visual data to the external device 2000.

In operation S1230, the external device 2000 may display the widget on the screen of the external device 2000 based on the received visual data. For example, the external device 2000 may display, on the screen of the external device 2000, the execution screen of the widget in an image form, a video form, or a text form, based on the visual data in an HTML form.

Figure 13:
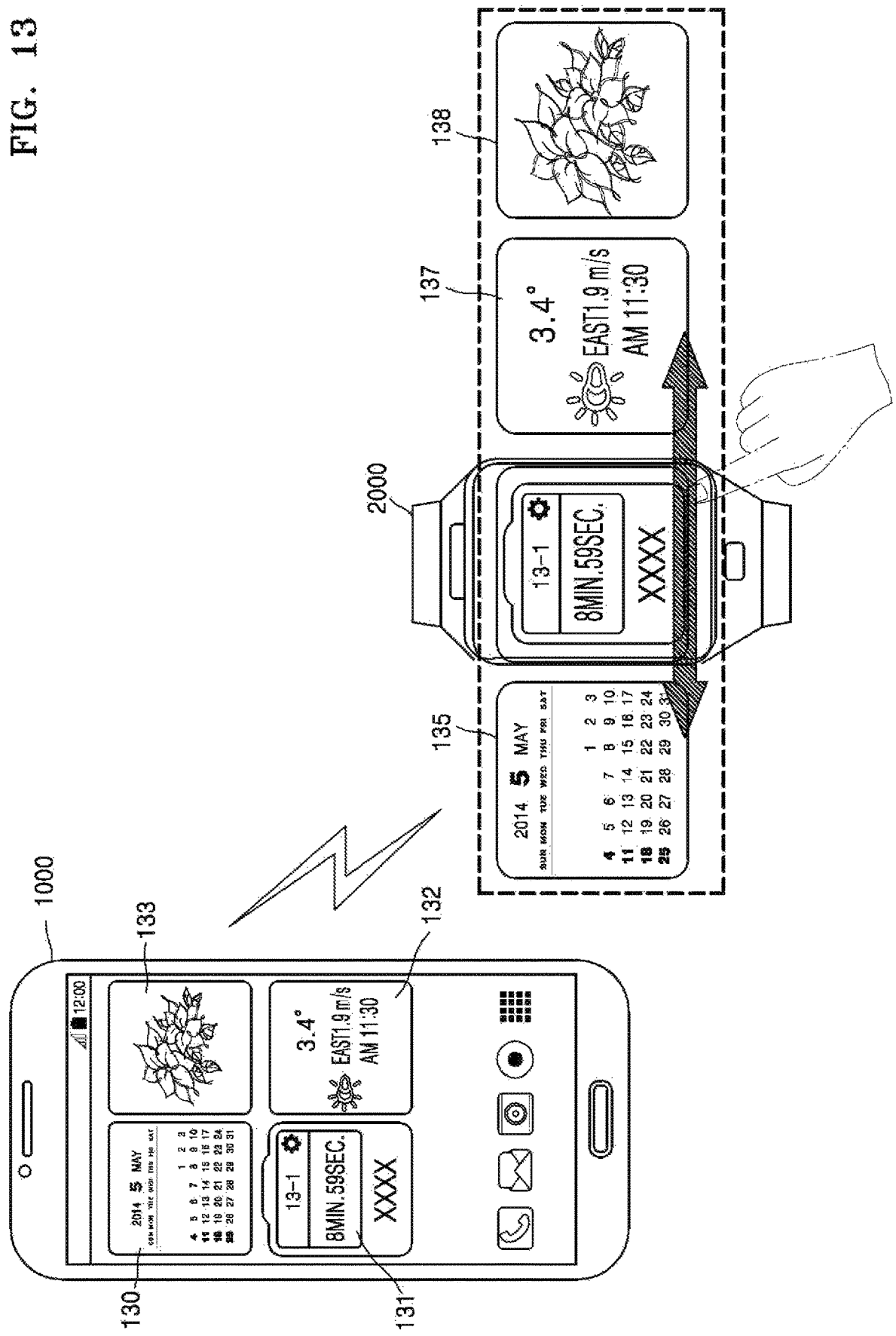
FIG. 13 is a diagram of an example in which an external device displays an execution screen of a widget being executed on a device, according to some embodiments.

FIG. 13 is a diagram of an example in which the external device 2000 displays the execution screen of the widget being executed on the device 1000, according to some embodiments.

Referring to FIG. 13, the device 1000 may display, on the screen of the device 1000, execution screens 130, 131, 132, and 133 of four widgets and as the device 1000 establishes the communication connection with the external device 2000, the device 1000 may provide the external device 2000 with pieces of visual data that correspond to the execution screens 130 to 133 of the widgets.

Also, the external device 2000 may display, on the screen of the external device 2000, execution screens 135, 136, 137, and 138 based on the pieces of visual data that correspond to the execution screens 130 to 133 of the widgets. Sizes of the execution screens 135 to 138 of the widgets may be edited according to a screen size and a screen resolution of the external device 2000. In addition, the execution screens 135 to 138 of the widgets that are displayed by the external device 2000 may respectively form one page, and according to a user's swipe input, the execution screens 135 to 138 of the widgets may be sequentially displayed on the screen of the external device 2000.

Figure 14:
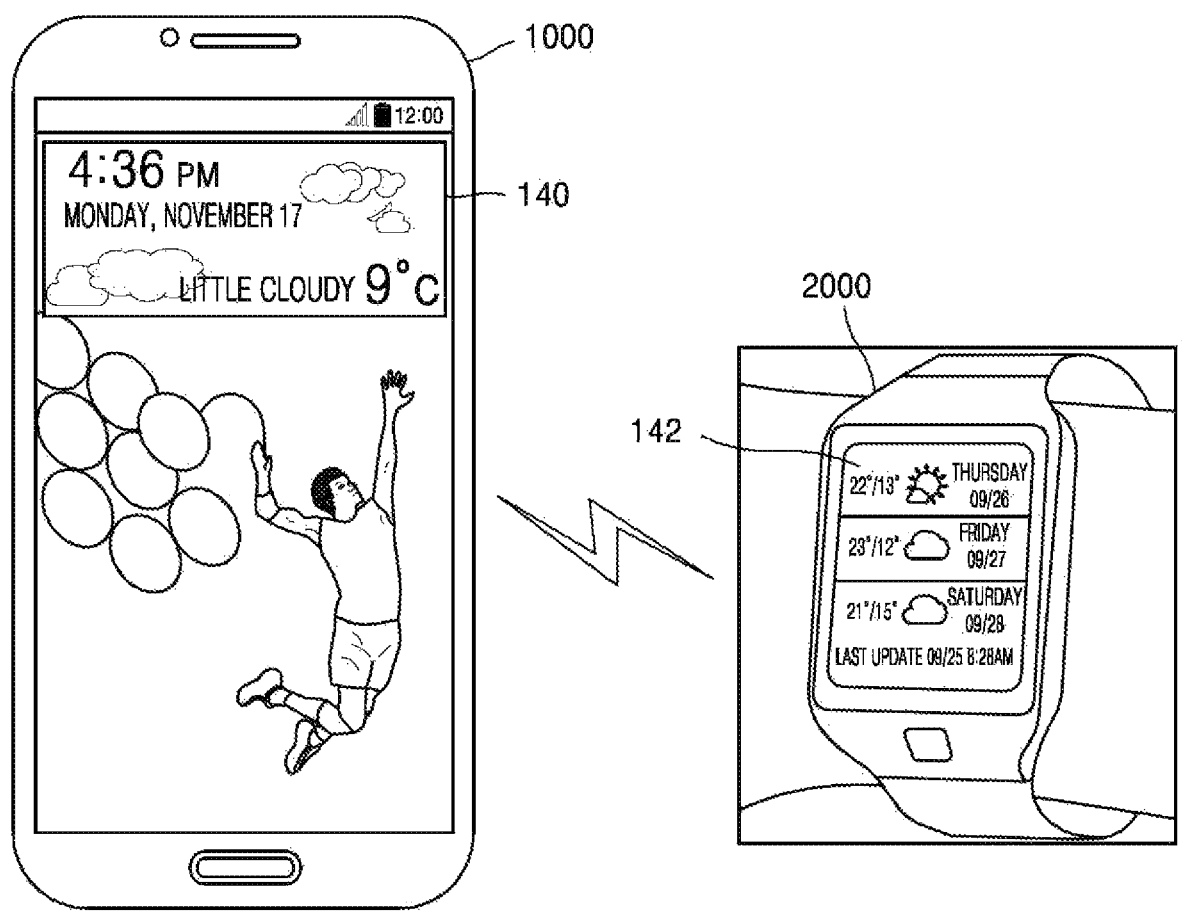
FIG. 14 is a diagram of an example in which an external device displays an execution screen that is edited from an execution screen of a widget being executed on a device, according to some embodiments.

FIG. 14 is a diagram of an example in which the external device 2000 displays an execution screen that is edited from the execution screen of the widget being executed on the device 1000, according to some embodiments.

Referring to FIG. 14, an execution screen 140 of a weather widget may be displayed on the screen of the device 1000. Also, the device 1000 may edit the execution screen 140 of the weather widget based on a layout and data of the weather widget, which are stored in the memory of the device 1000 in order to display the execution screen 140 of the weather widget, and thus may generate the visual data of the weather widget. In addition, the device 1000 may edit the execution screen 140 of the weather widget and thus may transmit the generated visual data to the external device 2000. The external device 2000 may receive the visual data and may display, on the screen of the external device 2000, an edited execution screen 142 of the weather widget based on the received visual data.

In this case, the edited execution screen 142 of the weather widget may have a size and a resolution that match the screen size and screen resolution of the external device 2000. Also, a layout and data that form the edited execution screen 142 of the weather widget may be different from the layout and data of the execution screen 140 of the weather widget.

Figure 15:
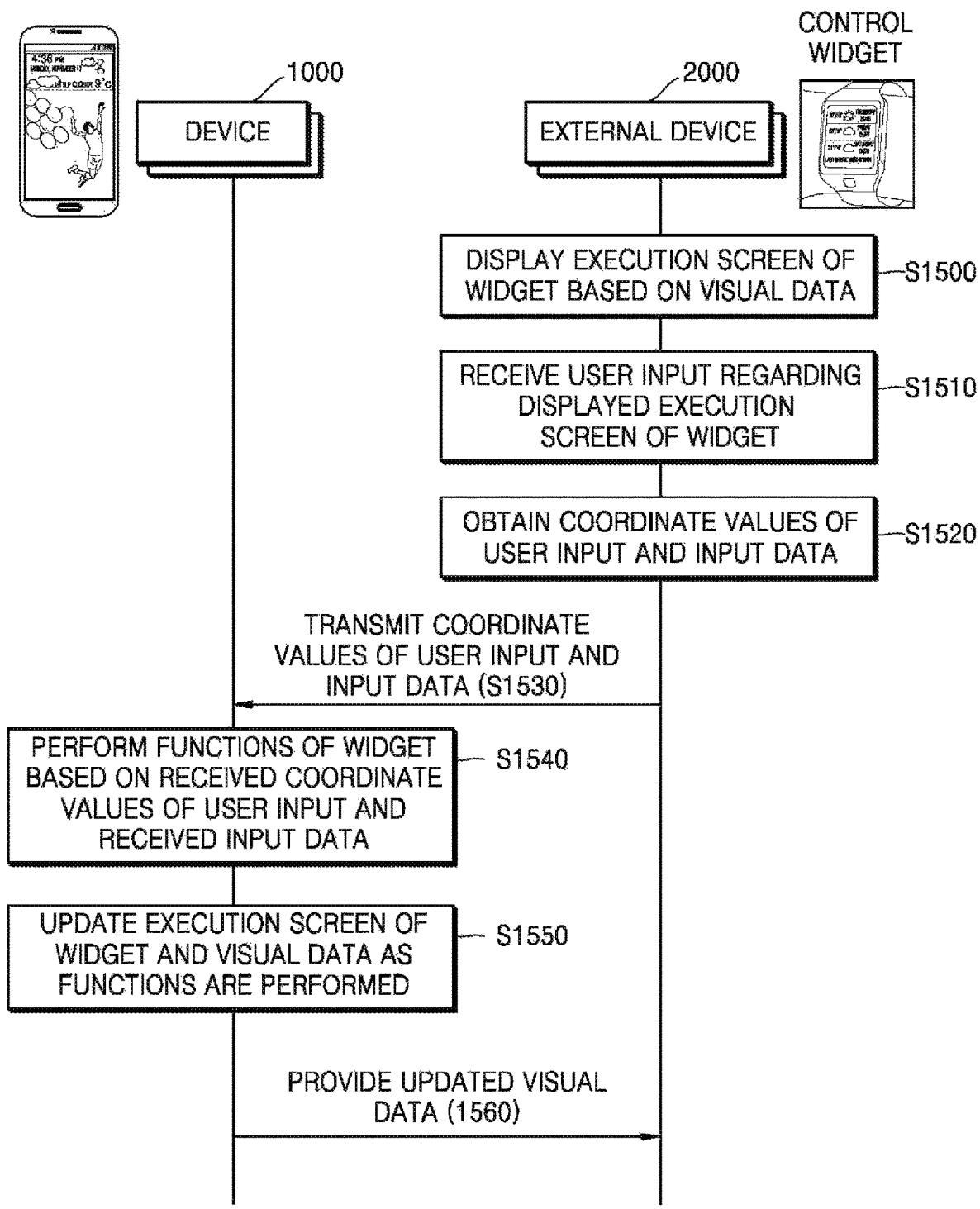
FIG. 15 is a flowchart of a method by which a device performs a function of a widget according to a user input from an external device, according to some embodiments.

FIG. 15 is a flowchart of a method by which the device 1000 performs a function of a widget according to a user input from the external device 2000, according to some embodiments.

In operation S1500, the external device 2000 may display the execution screen of the widget on the screen of the external device 2000 based on the visual data of the widget. In this case, the widget is executed on the device 1000, and the external device 2000 displays an execution screen indicating a result of executing the widget on the device 1000.

In operation S1510, the external device 2000 may receive a user input regarding the displayed execution screen of the widget. The user may touch a certain region of the execution screen of the widget which is displayed on the screen of the external device 2000 or may input certain input data by using a keypad of the external device 2000.

In operation S1520, the external device 2000 may obtain coordinate values of the user input and the input data. As the user touches a certain region of the execution screen of the widget which is displayed on the screen of the external device 2000, the external device 2000 may obtain coordinate values indicating a location of the region of the execution screen which is touched by the user. Also, when the user inputs certain input data by using the keypad of the external device 2000, the external device 2000 may obtain the input data that is input by the user.

In operation S1530, the external device 2000 may transmit the coordinate values of the user input and the input data. The external device 2000 may transmit in real time the coordinate values of the user input and the input data, as a user input regarding the displayed execution screen of the widget is received.

In operation S1540, the device 1000 may perform a function of the widget based on the received coordinate values of the user input and the received input data. Just as the user of the device 1000 inputs the user input to the device 1000 based on the received coordinate values of the user input and the received input data, the device 1000 may perform the function of the widget.

The device 1000 may identify object that corresponds to the coordinate values of the user input, which are received from the external device 2000, from among the objects on the execution screen of the widget being executed on the device 1000. Then, the device 1000 may perform a function among functions of the widget, the function being activated when the identified object is selected. Also, the device 1000 may use the input data received from the external device 2000 as the input data of the widget being executed on the device 1000 and thus may perform a certain function of the widget being executed on the device 1000.

In operation S1550, as the function of the widget is performed, the device 1000 may update the execution screen and the visual data of the widget. The device 1000 may update the execution screen of the widget as the certain function of the widget is performed. The device 1000 may use a layout and data of the widget, which are changed due to the update of the execution screen of the widget, and may update the visual data of the widget to be provided to the external device 2000. In this case, the changed layout and data of the widget may be stored in the memory of the device 1000 before the updated execution screen of the widget is displayed on the screen of the device 1000.

In operation S1560, the device 1000 may provide the updated visual data to the external device 2000. Also, the external device 2000 may use the updated visual data and may update the execution screen of the widget that is displayed on the screen of the external device 2000.

Referring to FIG. 15, it has been described that the device 1000 provides the visual data of the widget to the external device 2000, which is updated based on the coordinate values of the user input and the input data that are received from the external device 2000. However, the present disclosure is not limited thereto. For example, the execution screen of the widget being executed on the device 1000 may be updated when the user inputs a user input to the device 1000, and as the execution screen of the widget being executed on the device 1000 is updated, the device 1000 may update the visual data of the widget.

Also, as the communication connection method used between the device 1000 and the external device 2000 is changed, the device 1000 may not update the execution screen of the widget being executed on the device 1000, but may update only the visual data of the widget. For example, when the communication connection method used between the device 1000 and the external device 2000 is changed from Wi-Fi communication to Bluetooth communication, the device 1000 may change visual data in an image form to visual data in a text form and may transmit the changed visual data to the external device 2000.

Figure 16:
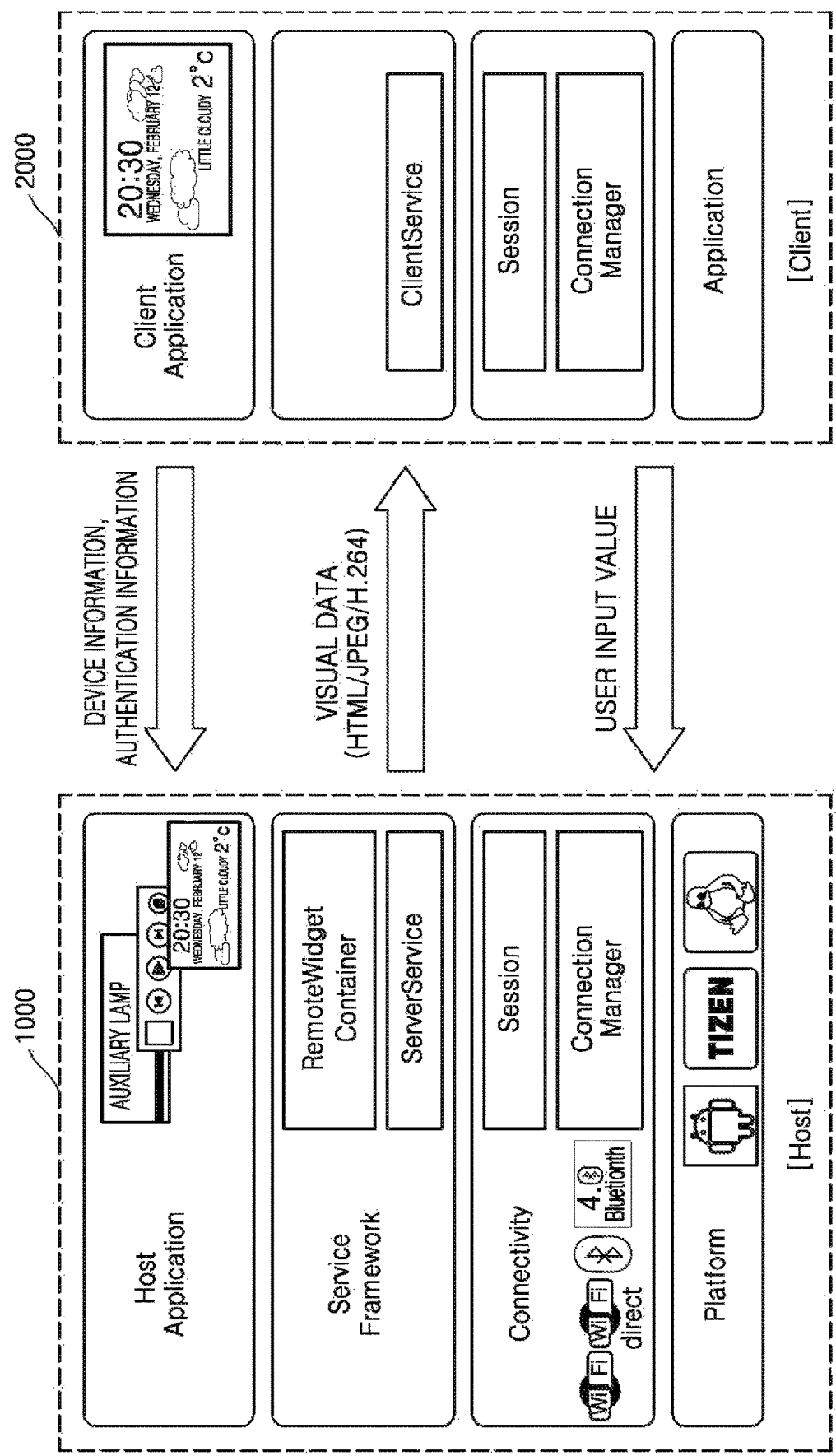
FIG. 16 is a diagram of an example of sharing a widget between a device and an external device, according to some embodiments.

FIG. 16 is a diagram of an example of sharing a widget between the device 1000 and the external device 2000, according to some embodiments.

Referring to FIG. 16, the device 1000 may register the external device 2000 and the widget to be provided to the external device 2000 to RemoteWidget Container. Also, the device 1000 may receive device information and authentication information from the external device 2000 and may authenticate the external device 2000. The device 1000 may generate the visual data of the widget to provide the external device 2000 with the widget being executed on the device 1000 and may provide the generated visual data to the external device 2000. Then, the device 1000 may receive a user input value from the external device 2000 and may control the widget being executed on the device 1000 according to the received user input value.

Figure 17:
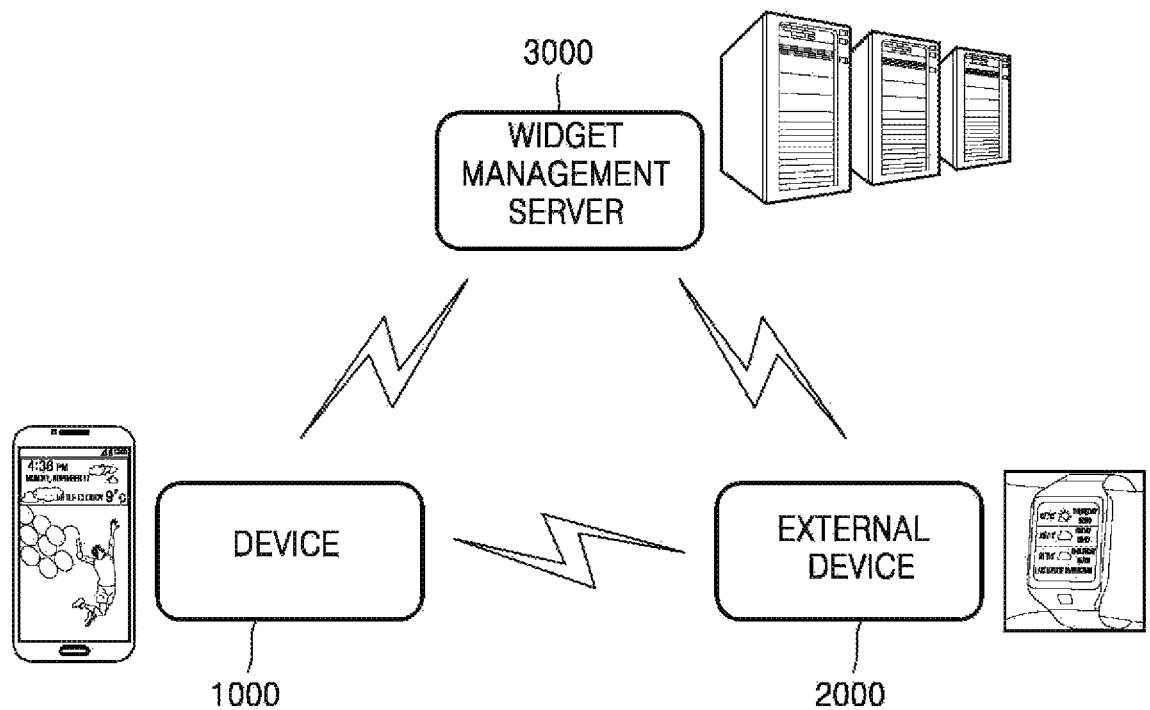
FIG. 17 is a diagram of an example of a widget sharing system including a widget management server, according to some embodiments.

FIG. 17 is a diagram of an example of a widget sharing system including a widget management server 3000, according to some embodiments.

Referring to FIG. 17, the device 1000, the external device 2000, and the widget management server 3000 respectively form networks, and the widget management server 3000 may register and manage the widget that may be provided by the device 1000 to the external device 2000. The widget management server 3000 may store and manage setting information regarding which widget is to be provided by the device 1000 to the external device 2000. Also, the widget management server 3000 may store and manage setting information regarding which type of visual data of the widget is to be transmitted by the device 1000.

Figure 18:
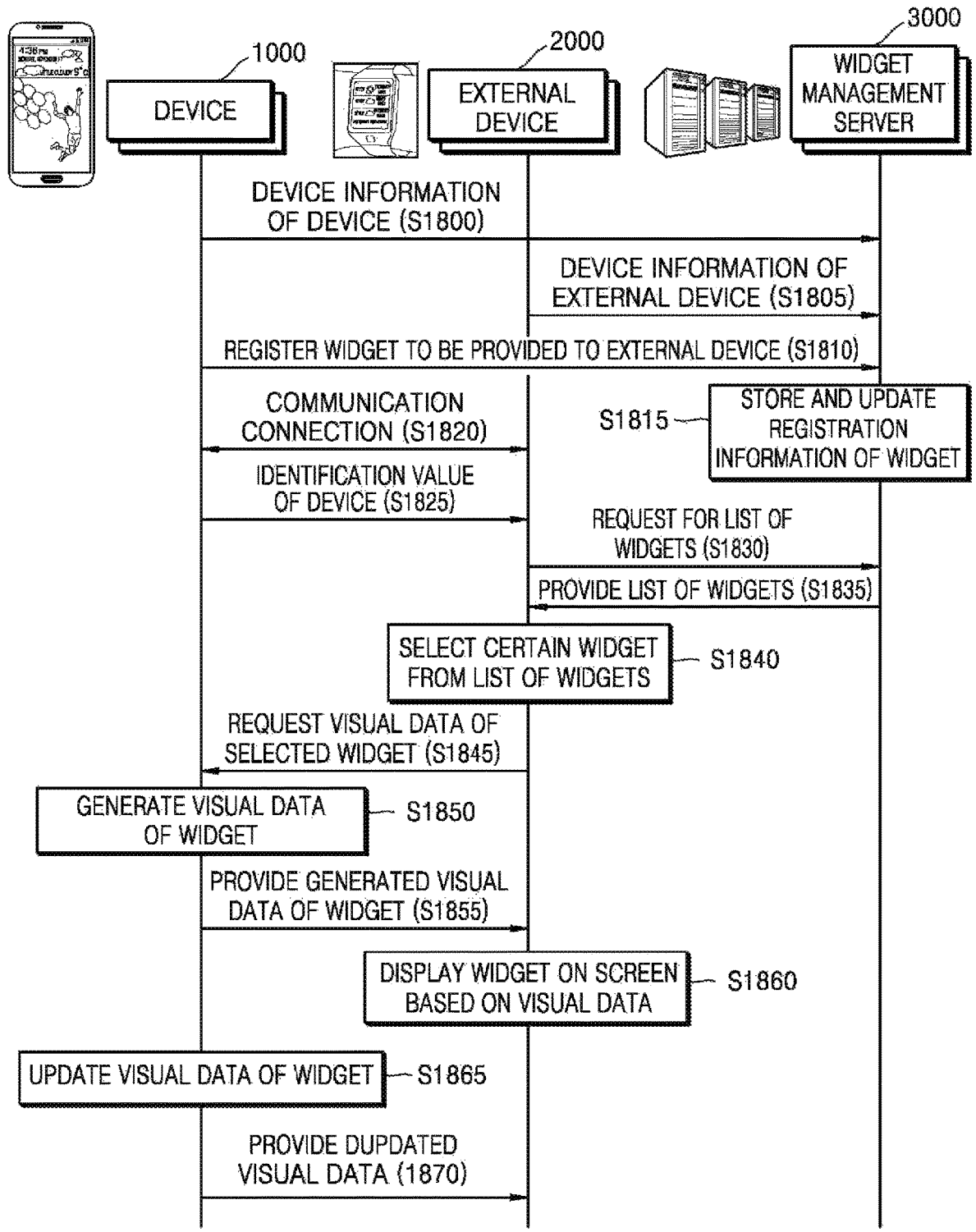
FIG. 18 is a flowchart of a method by which a device and an external device manage a widget by using a widget management server, according to some embodiments.

FIG. 18 is a flowchart of a method by which the device 1000 and the external device 2000 manage the widget by using the widget management server 3000, according to some embodiments.

In operation S1800, the device 1000 may provide the device information of the device 1000 to the widget management server 3000, and in operation S1805, the external device 2000 may provide the device information of the external device 2000 to the widget management server 3000. Device information may include, for example, information regarding a model name, a type, functions, a screen resolution, a processor, an OS, and a communication method of a device.

In operation S1810, the device 1000 may register the widget to be provided to the external device 2000 to the widget management server 3000. The device 1000 may register, to the widget management server 3000, the widget that is to be provided to the external device 2000 among widgets installed on the device 1000. The device 1000 may select all or some of the regions of the execution screen of the widget and may register the selected regions of the execution screen to the widget management server 3000. The device 1000 may register, to the widget management server 3000, the format of the visual data of the widget to be provided to the external device 2000. Also, the device 1000 may register the authority of the user of the widget or the authority of the external device 2000 to the widget management server 3000.

In operation S1815, the widget management server 3000 may store and update registration information of the widget. The widget management server 3000 may restore and update the registration information of the widget in response to a request from the device 1000 or the external device 2000.

In operation S1820, the device 1000 may establish a communication connection with the external device 2000. As the device 1000 comes close to the external device 2000 within a communication coverage range, the device 1000 may be connected to the external device 2000 via short distance communication. However, the present disclosure is not limited thereto. The device 1000 may be connected to the external device 2000 in various communication manners.

In operation S1825, the device 1000 may transmit the identification value of the device 1000 to the external device 2000, and in operation S1830, the external device 2000 may send, to the widget management server 3000, a request for the list of widgets that the external device 2000 may receive from the device 1000. The external device 2000 may provide the widget management server 3000 with the identification values of the device 1000 and the external device 2000 which are received from the device 1000 and may send a request for the list of widgets to the widget management server 3000. In addition, the external device 2000 may provide the widget management server 3000 with information regarding a current state (e.g., a state showing available resource, a network connection state, etc.) of the external device 2000.

In operation S1835, the widget management server 3000 may provide the external device 2000 with the list of widgets that is requested by the external device 2000. The widget management server 3000 may extract, from the registration information stored in operation S1815, the list of widgets that the device 1000 may provide to the external device 2000, based on the identification value of the device 1000, the identification value of the external device 2000, and the current state of the external device 2000.

Operations S1840 to S1870 respectively correspond to operations S525 to S555, and thus detailed descriptions thereof will be omitted.

Figure 19:
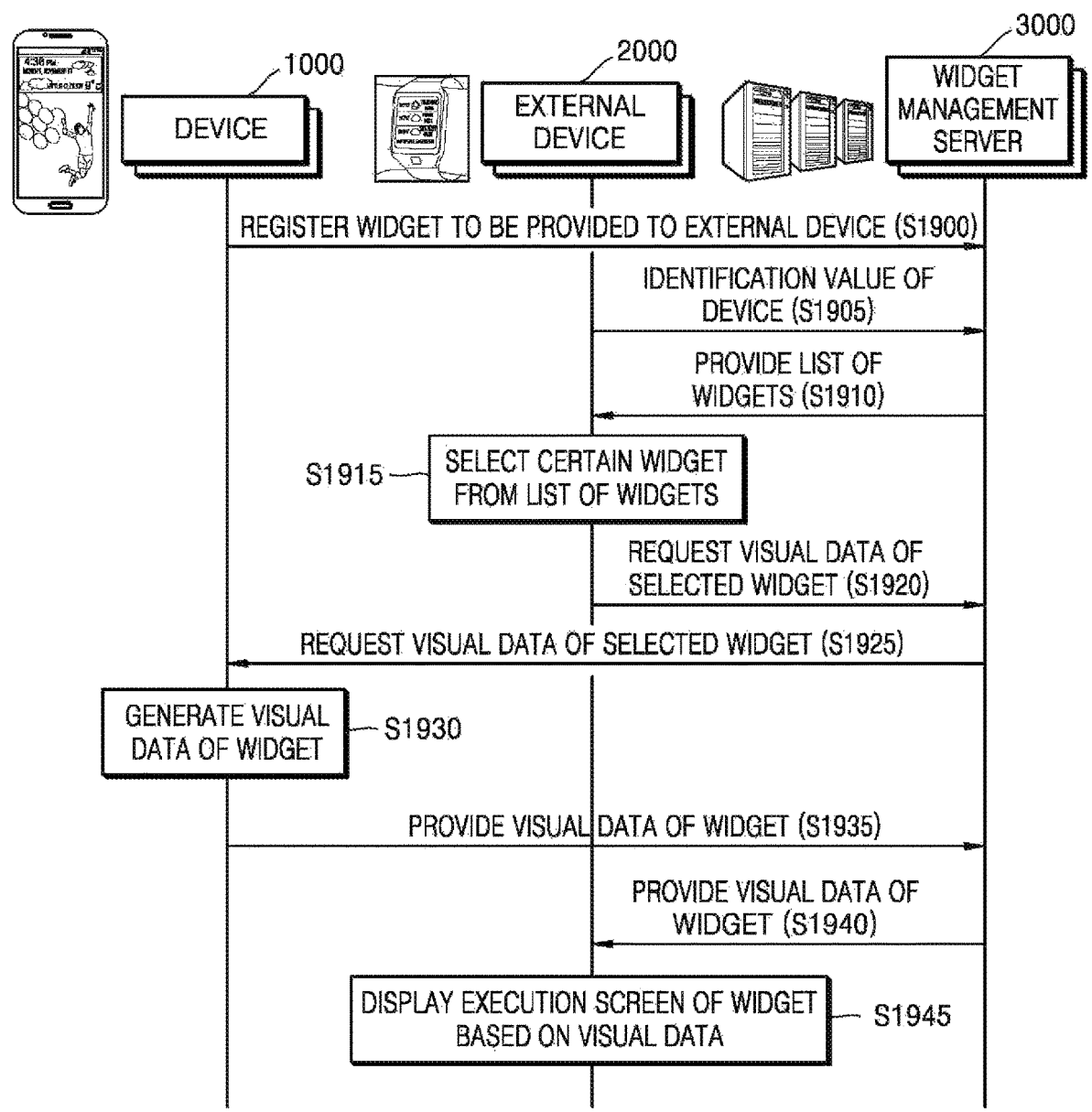
FIG. 19 is a flowchart of a method by which a device and an external device share a widget via a widget management server, according to some embodiments.

FIG. 19 is a flowchart of a method by which the device 1000 and the external device 2000 share the widget via the widget management server 3000, according to some embodiments.

In operation S1900, the device 1000 may register the widget to be provided to the external device 2000 to the widget management server 3000.

In operation S1905, the external device 2000 may provide the identification value of the device 1000 to the widget management server 3000. The external device 2000 may provide the identification value of the device 1000 to the widget management server 3000 and may send, to the widget management server 3000, the request for the list of widgets that the external device 2000 may receive from the device 1000. In this case, the user of the external device 2000 may directly input the identification value of the device 1000 or may select the identification value of the device 1000 that is stored in the external device 2000 in advance. Also, the device 1000 and the external device 2000 may be in a remote distance from each other. In addition, the external device 2000 may request the list of widgets and may provide the widget management server 3000 with the information regarding the current state of the external device 2000.

In operation S1910, the widget management server 3000 may provide the list of widgets to the external device 2000, and in operation S1915, the external device 2000 may select a certain widget from the list of widgets.

In operation S1920, the external device 2000 may send a request for visual data of the selected widget to the widget management server 3000, and in response to the request from the external device 2000, the widget management server 3000 may send the request for the visual data of the selected widget to the device 1000.

In operation S1930, the device 1000 may generate the visual data of the widget, and in operation S1935, the device 1000 may provide the generated visual data of the widget to the widget management server 3000. Then, in operation S1940, the widget management server 3000 may provide the visual data of the widget to the external device 2000, and in operation S1945, the external device 2000 may display the execution screen of the widget on the screen of the external device 2000 based on the visual data.

Figure 20:
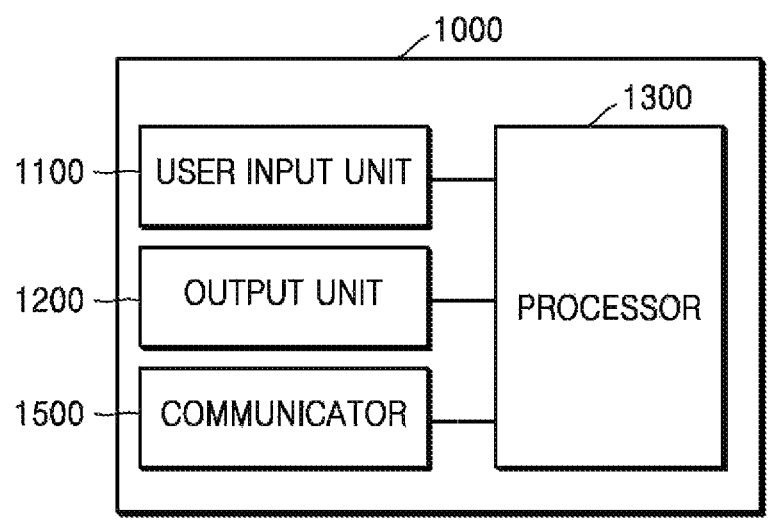
FIGS. 20 and 21 are block diagrams of a device according to some embodiments.
Figure 21:
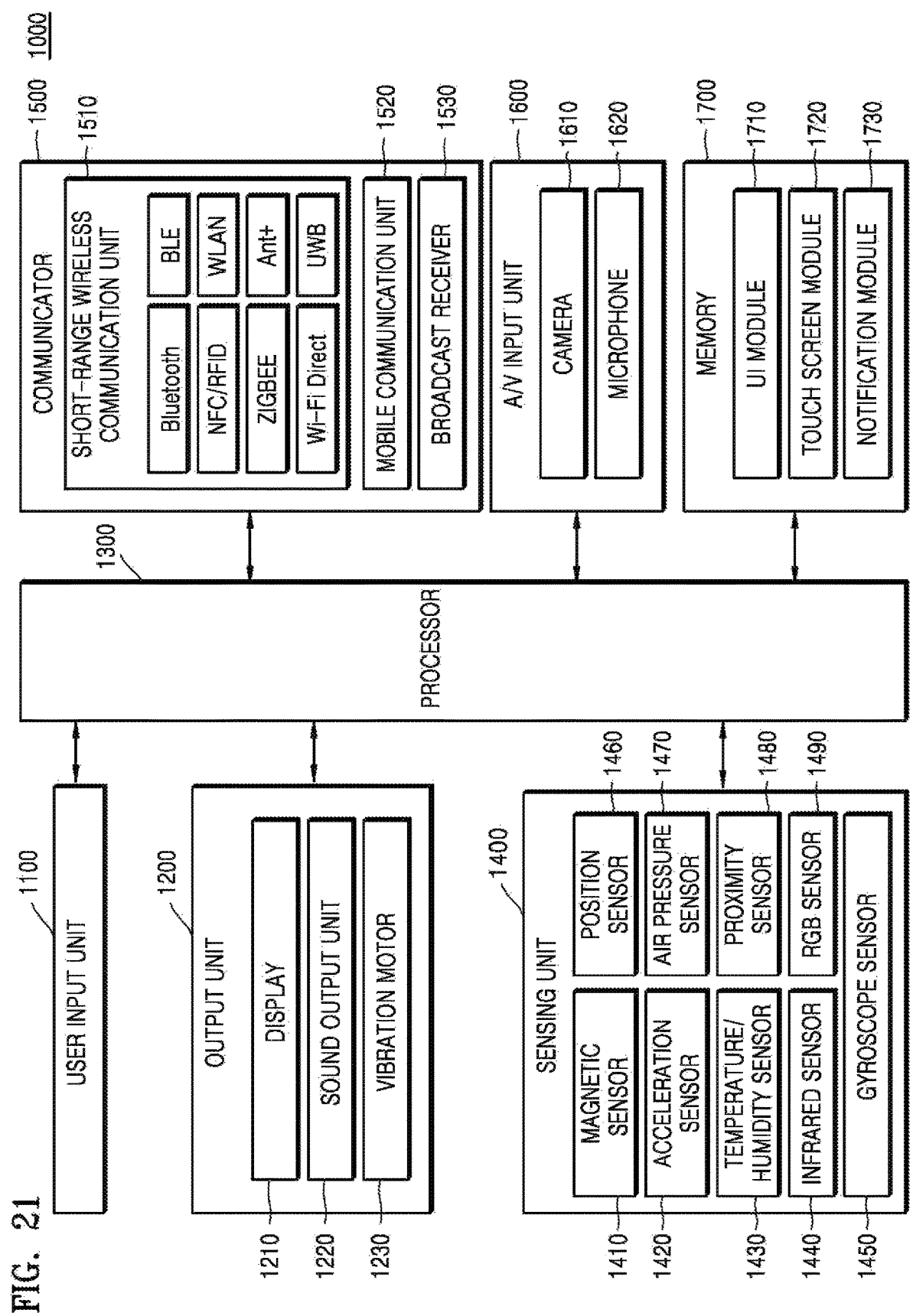

FIGS. 20 and 21 are block diagrams of the device 1000 according to some embodiments.

As illustrated in FIG. 20, the device 1000 according to some embodiments may include a user input unit 1100, an output unit 1200, a processor 1300, and a communicator 1500. However, not every component shown in FIG. 20 is necessary. The device 1000 may be embodied by more or less components than the components shown in FIG. 20.

For example, as shown in FIG. 21, the device 1000 according to some embodiments may further include a sensing unit 1400, an audio/video (A/V) input unit 1600, and a memory 1700 in addition to the user input unit 1100, the output unit 1200, the processor 1300, and the communicator 1500.

The user input unit 1100 may be a unit by which a user inputs data to control the device 1000. For example, the user input unit 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but one or more embodiments are not limited thereto. The user input unit 1100 may receive a user input for registering a widget.

The output unit 1200 may output an audio signal, a video signal, or a vibration signal and may include a display 1210, a sound output unit 1220, a vibration motor 1230, or the like.

The display 1210 displays and outputs information that is processed in the device 1000. For example, the display 1210 may display an execution screen of a widget being executed on the device 1000.

When the display 1210 and a touch pad form a layer structure and thus are formed as a touch screen, the display 1210 may be used as an output device as well as an input device. The display 1210 may include at least one of a liquid crystal display (LCD), a thin film transistor-liquid crystal display (TFT-LCD), an organic light-emitting diode display, a flexible display, a 3-dimensional (3D) display, and an electrophoretic display. Also, according to an implementation type of the device 1000, the device 1000 may include two or more displays 1210. In this case, the two or more displays 1210 may face each other by using a hinge.

The sound output unit 1220 outputs audio data that is received from the communicator 1500 or is stored in the memory 1700. The sound output unit 122 may also output a sound signal (e.g., a call signal receiving sound, a message receiving sound, a notification sound, or the like) related to functions performed by the device 1000. The sound output unit 122 may include a speaker, a buzzer, or the like.

The vibration motor 123 may output a vibration signal. For example, the vibration motor 123 may output the vibration signal that corresponds to an output of audio data (e.g., a call signal receiving sound, a message receiving sound, or the like) or video data. Also, when a touch is input to the touch screen, the vibration motor 123 may output a vibration signal.

The processor 1300 may generally control all operations of the device 1000. The processor 1300 may control operations of the device 1000 that are described with reference to FIGS. 1 to 19. For example, the processor 1300 may execute programs stored in the memory 1700 and thus may generally control the user input unit 1100, the output unit 1200, the sensing unit 1400, the communicator 1500, the A/V input unit 1600, and the like.

The processor 1300 may register the widget to be provided to the external device 2000 and may generate the visual data of the widget so as to provide the generated visual data to the external device 2000. The processor 1300 may update the visual data of the widget.

In particular, the processor 1300 may register the widget to be provided to the external device 2000. The processor 1300 may select the list of widgets installed on the device 1000 and the external device 2000 that is expected to receive the widget and thus may register the widget to be provided to the external device 2000 to the memory of the device 1000 or the widget management server 3000. The processor 1300 may select all or some of the regions of the execution screen of the widget and may map the selected regions of the execution screen of the widget to the external device 2000. The processor 1300 may set the format of the visual data of the widget to be provided to the external device 2000. Also, the processor 1300 may set the authority of the user of the widget or the authority of the external device 2000. The processor 1300 may set the widget that the user or the external device 2000 may use, and a certain function of the widget.

In addition, the processor 1300 may store device information of the external device 2000 in the memory 1700 or the widget management server 3000. Device information may include, for example, a model name, a type, functions, a screen resolution, a processor, an OS, and a communication method of a device. The processor 1300 may receive the device information of the external device 2000 from the external device 2000. However, the present disclosure is not limited thereto. The device 1000 may receive the device information of the external device 2000 from a separate server (not shown).

Also, the processor 1300 may establish a communication connection with the external device 2000. As the device 1000 comes close to the external device 2000 within a communication coverage range, the device 1000 may be connected to the external device 2000 via short-distance communication. However, the present disclosure is not limited thereto. The device 1000 may be connected to the external device 2000 in various communication manners.

Also, the processor 1300 may receive authentication information from the external device 2000 and may authenticate the external device 2000. The processor 1300 may provide a list of widgets to the authenticated external device 2000.

Also, the processor 1300 may generate visual data of the widget. The processor 1300 may generate visual data corresponding to a selected region of the execution screen of the widget. Before displaying the execution screen of the widget on the screen of the device 1000, the processor 1300 may generate the visual data based on screen information of the execution screen of the widget which is stored in the memory 1700 of the device 1000.

For example, the processor 1300 may extract a layout and data of a widget application stored in the memory 1700 of the device 1000 and may generate visual data to be provided to the external device 2000 based on the extracted layout and data. In this case, the processor 1300 may extract significant characteristics corresponding to the selected region of the execution screen of the widget from the layout and data that are extracted from the memory 1700 and may map the extracted characteristics to an HTML object, thereby generating visual data in an HTML form.

Also, the processor 1300 may edit the layout of the widget application or change a format of the visual data according to specifications of the external device 2000. In addition, the processor 1300 may change the format of the visual data according to a communication method of the device 1000 and the external device 2000. The visual data may include, for example, formats of an image file, a text file, and a video file, but is not limited thereto.

Moreover, the processor 1300 may provide the generated visual data to the external device 2000. The processor 1300 may provide the generated visual data to the external device 2000 in response to a request from the external device 2000. However, the present disclosure is not limited thereto. The processor 1300 may push the external device 2000 to receive the generated visual data even when there is no request from the external device 2000.

The processor 1300 may provide the visual data of the widget to the external device 2000 in a predefined cycle. Also, as the execution screen of the widget being executed on the device 1000 is updated, the processor 1300 may provide the external device 2000 with visual data indicating the updated execution screen. The processor 1300 may push the external device 2000 to receive the generated visual data even when there is no request from the external device 2000.

The sensing unit 1400 may detect a state of the device 1000 or a state around the device 1000 and may transmit detected information to the processor 1300.

The sensing unit 1400 may include at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, an air pressure sensor 1470, a proximity sensor 1480, and an RGB sensor (i.e., an illumination sensor) 1490. However, sensors included in the sensing unit 1400 are not limited thereto. Functions of respective sensors may be intuitively inferred by one of ordinary skill in the art, and thus detailed descriptions thereof will be omitted.

The communicator 1500 may include at least one component that enables communication between the external device 2000 and/or the widget management server 3000. For example, the communicator 1500 may include a short-range wireless communication unit 1510, a mobile communication unit 1520, and a broadcast receiver 1530.

The short-range wireless communication unit 1510 may include a Bluetooth communication unit, a Bluetooth Low Energy (BLE) communication unit, a Near Field communication unit, a WLAN (Wi-Fi) communication unit, a ZigBee communication unit, an Infrared Data Association (IrDA) communication unit, a Wi-Fi Direct (WFD) communication unit, an ultra wideband (UWB) communication unit, an Ant+ communication unit, or the like. However, the short-range wireless communication unit 1510 is not limited thereto.

The mobile communication unit 1520 may receive/transmit a wireless signal from/to at least one of a broadcast station, an external terminal, and a server via a mobile communication network. The wireless signal may include various types of data according to reception/transmission of a voice call signal, a video-call call signal, or a text message/multimedia message.

The broadcast receiver 1530 may receive information regarding a broadcasting signal and/or broadcast-related information from the outside via a broadcast channel. The broadcast channel may include a satellite channel and a terrestrial channel. Depending on an implementation example, the device 1000 may not include the broadcast receiver 1530.

Also, the communicator 1500 may receive/transmit information used to provide a widget to the external device 2000 and visual data of the widget from/to the external device 2000. The communicator 1500 may receive/transmit information used to register the widget, the information used to provide the widget to the external device 2000, and the visual data of the widget from/to the widget management server 3000.

The A/V input unit 1600 may be configured to receive an audio signal or a video signal and may include a camera 1610, a microphone 1620, and the like. The camera 1610 may obtain an image frame such as a static image or a moving image via an image sensor in a video call mode or a shooting mode. An image captured by the image sensor may be processed by the processor 1300 or a separate image processor (not shown).

The image frame processed by the camera 1610 may be stored in the memory 1700 or transmitted to the outside by the communicator 1500. There may be at least two cameras 1610 according to a structure of a terminal.

The microphone 1620 may receive an external sound signal and process the received external sound signal into electrical voice data. For example, the microphone 1620 may receive a sound signal from an external device or a speaker. The microphone 1620 may use various noise removal algorithms for removing noise generated while the external sound signal is input.

The memory 1700 may store programs for processing and controlling the processor 1300 and may store data that is input to the device 1000 or output therefrom. The memory 1700 may store registration information of the widget.

The memory 1700 may include at least one storage medium from among a flash memory-type storage medium, a hard disk-type storage medium, a multimedia card micro-type storage medium, card-type memory (e.g., an SD card, an XD memory, or the like), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disc, and an optical disc.

Programs stored in the memory 1700 may be classified into multiple modules according to functions thereof. For example, the programs may be classified into a UI module 1710, a touch screen module 1720, a notification module 1730, and the like.

The UI module 1710 may provide a specialized UI or GUI which interoperates with the device 1000 according to applications. The touch screen module 1720 may detect a user's touch gesture on a touch screen and may transmit information regarding the touch gesture to the processor 1300. The touch screen module 1720 according to some embodiments may recognize and analyze touch codes. The touch screen module 1720 may be configured as separate hardware including a controller.

Various sensors may be arranged in or near the touch screen so as to detect a touch or a proximate touch on the touch sensor. An example of the sensor to detect the touch on the touch screen may be a tactile sensor. The tactile sensor detects a contact of a specific object by at least as much as a person can detect. The tactile sensor may detect various types of information such as the roughness of a contact surface, the hardness of the contact object, a temperature of a contact point, or the like.

An example of the sensor to detect the touch on the touch screen may be a proximity sensor.

The proximity sensor indicates a sensor of detecting existence of a subject that comes close to or in vicinity of a certain detection surface by using an electromagnetic field or infrared rays instead of mechanical contact. Examples of the proximity sensor may be a through-scan type photoelectric sensor, a direct reflection-type photoelectric sensor, a mirror reflection-type photoelectric sensor, a high-frequency oscillation-type proximity sensor, a capacitive proximity sensor, a magnetic proximity sensor, an infrared proximity sensor, and the like. The touch gesture of the user may include a tap gesture, a touch & hold gesture, a double tap gesture, a drag gesture, a panning gesture, a flick gesture, a drag & drop gesture, a swipe gesture, or the like.

The notification module 1730 may generate a signal for notifying the occurrence of events on the device 1000. Examples of events occurring on the device 1000 may be call signal reception, message reception, key signal reception, a schedule notification, and the like. The notification module 1730 may output a notification signal as a video signal through the display 1210, as an audio signal through the sound output unit 1220, or as a vibration signal through the vibration motor 1230.

Figure 22:
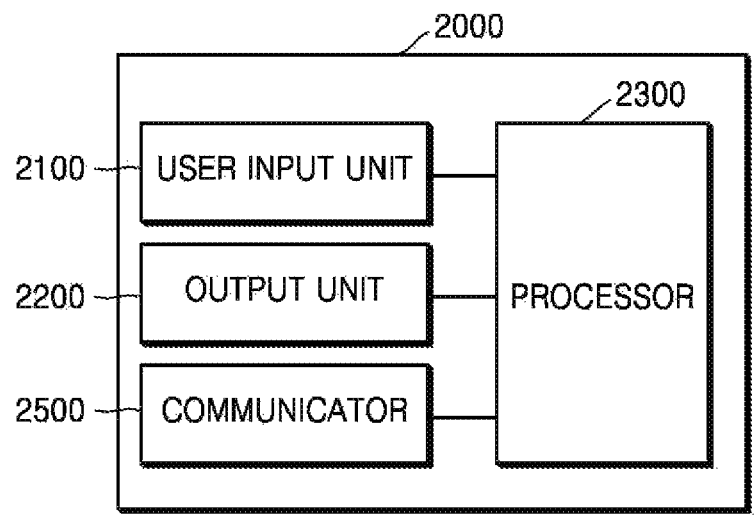
FIG. 22 is a block diagram of an external device according to some embodiments.

FIG. 22 is a block diagram of the external device 2000 according to some embodiments.

As illustrated in FIG. 22, the external device 2000 according to some embodiments may include a user input unit 2100, an output unit 2200, a processor 2300, and a communicator 2500. However, not every component shown in FIG. 21 is necessary. The device 1000 may be embodied by more or less components than the components shown in FIG. 21.

The user input unit 2100 may be a unit by which a user inputs data to control the external device 2000. For example, the user input unit 2100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but one or more embodiments are not limited thereto. The user input unit 2100 may receive a user input for selecting a widget from a list of widgets and a user input regarding an execution screen of a widget.

The output unit 2200 may output an audio signal, a video signal, or a vibration signal and may include at least one of a display, a sound output unit, and a vibration motor.

The display may display and output information processed by the external device 2000. For example, the display may display the execution screen of the widget. The sound output unit may output audio data, and the vibration motor may output a vibration signal.

The processor 2300 may generally control all operations of the external device 2000. The processor 2300 may control operations of the external device 2000 that are described with reference to FIGS. 1 to 19. For example, the processor 2300 may execute programs stored in a memory of the external device 2000 and thus may generally control the user input unit 2100, the output unit 2200, the communicator 2500, and the like.

The processor 2300 may receive the list of widgets being executed on the device 1000 from the device 1000 or the widget management server 3000 and may receive visual data of a certain widget included in the list of the widgets from the device 1000 or the widget management server 3000. Also, the processor 2300 may display the execution screen of the widget and may provide the device 1000 or the widget management server 3000 with a user input value regarding the execution screen of the widget.

In particular, the processor 2300 may control the communicator 2500 and thus may enable communication connection with the device 1000. As the device 1000 comes close to the external device 2000 within a communication coverage range, the device 1000 may be connected to the external device 2000 via short-distance communication. However, the present disclosure is not limited thereto. The device 1000 may be connected to the external device 2000 in various communication manners.

The processor 2300 may provide authentication information of the external device 2000 to the device 1000 or the widget management server 3000. The processor 2300 may provide, for example, the identification values of the device 1000 and the external device 2000 to the device 1000 or the widget management server 3000. Also, the processor 2300 may provide, for example, passwords and a key value to the device 1000 or the widget management server 3000. However, the present disclosure is not limited thereto.

The processor 2300 may receive the list of widgets from the device 1000 or the widget management server 3000 and may select a certain widget from the list of widgets. The processor 2300 may display the list of widgets on the screen of the external device 2000 and may select the certain widget from the displayed list of widgets according to the user selection input.

The processor 2300 may send the request for the visual data of the selected widget to the device 1000 or the widget management server 3000. The processor 2300 may provide the identification value of the selected widget to the device 1000 or the widget management server 3000 and thus may send the request for the visual data of the selected widget to the device 1000 or the widget management server 3000.

The processor 2300 may receive the visual data of the widget, which is generated by the device 1000, from the device 1000 or the widget management server 3000. The processor 2300 may receive the visual data of the widget from the device 1000 in a predefined cycle. Also, as the execution screen of the widget being executed on the device 1000 is updated, the processor 2300 may receive, from the device 1000, visual data indicating the updated execution screen.

The processor 2300 may display the execution screen of the widget on the screen of the external device 2000 based on the visual data. When the visual data is an image file, a text file, and a video file indicating the execution screen of the widget, the processor 2300 may display the visual data of the widget, which is received from the device 1000, on the screen of the external device 2000 without any change. Alternatively, when the visual data of the widget is an HTML file, the processor 2300 may translate the HTML file and thus may display the execution screen of the widget on the screen of the external device 2000. However, the present disclosure is not limited thereto.

The processor 2300 may receive the updated visual data from the device 1000. The device 1000 may push the external device 2000 to receive the updated visual data even when there is no request from the external device 2000.

The communicator 2500 may include at least one component for enabling communication between the device 1000 and/or the widget management server 3000. For example, the communicator 2500 may include a short-range wireless communication unit, a mobile communication unit, and a broadcast receiver.

Figure 23:
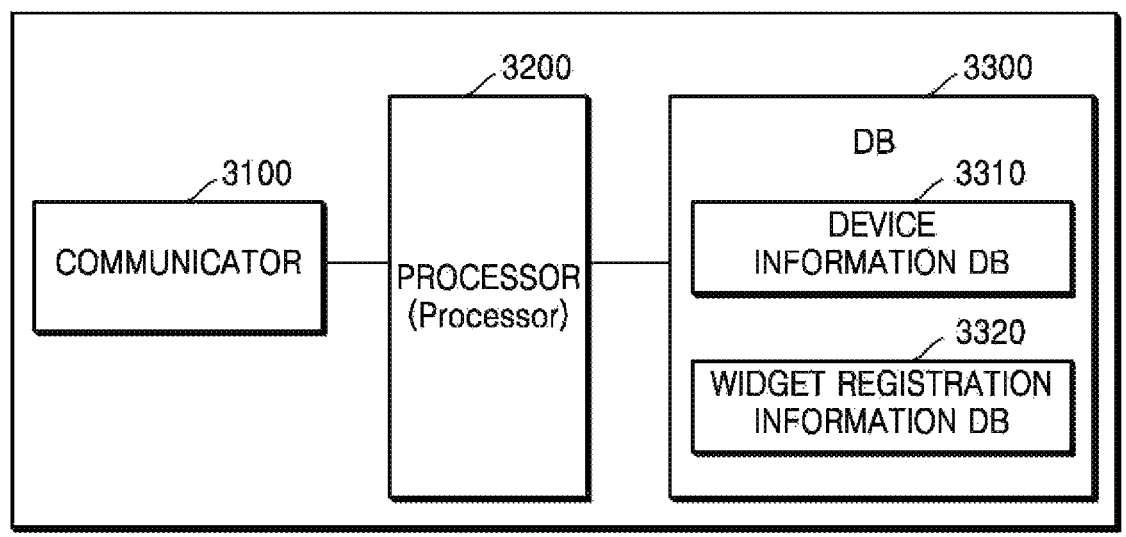
FIG. 23 is a block diagram of a widget management server according to some embodiments.

FIG. 23 is a block diagram of the widget management server 3000 according to some embodiments.

Referring to FIG. 23, the widget management server 3000 according to some embodiments may include a communicator 3100, a processor 3200, and a database (DB) 3300, and the DB 3300 may include a device information DB 3310 and a widget registration DB 3320.

The communicator 3100 may receive/transmit, from/to the device 1000 and the external device 2000, various pieces of information for allowing the device 1000 to provide the widget to the external device 2000. For example, the communicator 3100 may include a short-range wireless communication unit, a mobile communication unit, and a broadcast receiver. However, the present disclosure is not limited thereto.

The processor 3200 may generally control all operations of the widget management server 3000. The processor 3200 may control operations of the widget management server 3000 that are described with reference to FIGS. 17 to 19. For example, the processor 3200 may execute programs stored in the DB 3300 and thus may generally control the communicator 3100, the DB 3300, and the like.

The processor 3200 may receive the device information of the device 1000 from the device 1000 and the device information of the external device 2000 from the external device 2000. The processor 3200 may register, to the DB 3300, the widget to be provided by the device 1000 to the external device 2000. The processor 3200 may register the widget that is to be provided to the external device 2000 from among the widgets installed on the device 1000. The processor 3200 may register, to the DB 3300, the identification value of the widget, all or some of the regions of the execution screen of the widget, the format of the visual data of the widget to be provided to the external device 2000, authority of the external device 2000 or the user of the widget, etc.

The processor 3200 may store and update the registration information of the widget. The processor 3200 may store and update the registration information of the widget in response to the request from the device 1000 or the external device 2000.

The processor 3200 may receive, from the external device 2000, the request for the list of widgets that the external device 2000 may receive from the device 1000. The external device 2000 may provide the widget management server 3000 with the identification values of the device 1000 and the external device 2000 which are received from the device 1000 and may send the request for the list of widgets to the widget management server 3000. Also, the external device 2000 may provide the widget management server 3000 with the information regarding the current state (e.g., a state showing available resource, a network connection state, etc.) of the external device 2000.

The processor 3200 may provide the external device 2000 with the list of widgets which is requested by the external device 2000. The processor 3200 may extract the list of widgets that the device 1000 may provide to the external device 2000 from the registration information stored in the DB 3300, based on the identification values of the device 1000 and the external device 2000, and the current state of the external device 2000.

The processor 3200 may receive, from the external device 2000, the request for the visual data of the widget selected by the external device 2000, and in response to the request from the external device 2000, the processor 3200 may send the request for the visual data of the widget to the device 1000.

The processor 3200 may receive the visual data of the widget generated by the device 1000 and may provide the visual data of the widget to the external device 2000.

In the present specification, it has been described that visual data in an HTML form is generated and used. However, the present disclosure is not limited thereto. Visual data in different forms of Markup languages, e.g., an XML form, may be generated and used.

Some embodiments can be embodied as a non-transitory computer-readable recording medium, for example, a program module, which includes instructions executable by a computer. The non-transitory computer-readable recording medium may be an arbitrarily available medium that may be accessed by a computer and may include a volatile medium, a non-volatile medium, a removable medium, and a non-removable medium. Also, the non-transitory computer-readable recording medium may include a computer storage medium and a communication medium. The computer storage medium includes a volatile medium, a non-volatile medium, a removable medium, and a non-removable medium that is embodied by an arbitrary method or technology in order to store information such as computer-readable instructions, data structures, program modules, or other types of data. The communication medium may generally include computer-readable instructions, data structures, program modules, data having modulated data signals, or other transmission mechanisms and may also include an arbitrary information transmission medium.

Also, the "unit" may be implemented as a hardware component such as a processor or a circuit, and/or a software component executed by a hardware component such as a processor.

It should be understood that embodiments described herein should be considered in a descriptive sense only and not for purposes of limitation. Descriptions of features or aspects within each embodiment should typically be considered as available for other similar features or aspects in other embodiments. For example, components of a single type may be executed in a distributed manner, and components of a distributed type may be integrated.

While one or more embodiments have been described with reference to the figures, it will be understood by one of ordinary skill in the art that various changes in form and details may be made therein without departing from the spirit and scope as defined by the following claims.

We claim:

1. A device comprising:
a communicator;
a memory; and
a processor configured to:
 register, as widget registration information, in the memory, information for one or more user interface widgets, the widget registration information comprising first widget registration information for a first user interface widget of the one or more user interface widgets, the first widget registration information comprising external device information of an external device and format information for a format of visual data for displaying the first user interface widget by the external device;
 control to establish a communication connection, via the communicator, with the external device;

generate visual data of the first user interface widget based on a layout of the first user interface widget and the format information; and control to transmit the generated visual data to the external device over the communication connection, wherein the processor is configured to use the layout to control to display an execution screen of the first user interface widget on a screen of the device.

2. The device of claim 1, wherein the processor is further configured to map, to an identification value of the external device, an identification value of the first user interface widget.

3. The device of claim 2, wherein the processor is further configured to map, to the identification value of the external device, one or more regions of the execution screen of the first user interface widget.

4. The device of claim 1, wherein the visual data is generated as at least one of an image file, a video file, and a text file, and the processor is further configured to:
determine a format of the visual data based on the external device information and
the format information, and
wherein the visual data is generated according to the determined format.

5. The device of claim 1, wherein the layout of the first user interface widget is stored in the memory before the execution screen of the first user interface widget is displayed on the screen of the device.

6. The device of claim 5, wherein the generating of the visual data comprises mapping, to at least one object written in a Markup language, the layout of the first user interface widget and all or some of pieces of data associated with the layout.

7. The device of claim 1, wherein the processor is further configured to:
determine the layout of the visual data based on the external device information, and
wherein the generating of the visual data is based on editing of the execution screen of the first user interface widget, according to the determined layout.

8. The device of claim 1, wherein the processor is further configured to:
determine a format of the visual data based on a network connection method with the external device, and
wherein the visual data is generated based on the determined format.

9. The device of claim 1, wherein the visual data is generated by capturing the execution screen of the first user interface widget.

10. The device of claim 1, wherein the processor is further configured to:
control to transmit, to the external device, via the communicator, a list of user interface widgets installed on the device; and
control to receive, from the external device, an identification value of a selected user interface widget, and
wherein the generating of the visual data comprises generating visual data for the selected widget.

11. A method, performed by a device, the method comprising:
registering, as widget registration information, in a memory of the device, information for one or more user interface widgets, the widget registration information comprising first widget registration information for a first user interface widget of the one or more user interface widgets, the first widget registration information comprising external device information an external device and format information for a format of visual data for displaying the first user interface widget by the external device;

establishing a communication connection, via a communicator of the device, with the external device;

generating visual data of the first user interface widget based on a layout of the first user interface widget and the format information, wherein the layout is used to display an execution screen of the first user interface widget on a screen of the device; and transmitting the generated visual data to the external device over the communication connection.

12. The method of claim 11, wherein, in the registering of the information for the one or more user interface widgets as widget registration information, an identification value of the first user interface widget is mapped to an identification value of the external device.

13. The method of claim 12, wherein, in the registering of the information for the one or more user interface widgets as widget registration information, one or more regions of the execution screen of the first user interface widget are mapped to the identification value of the external device.

14. The method of claim 11, wherein the visual data is generated as at least one of an image file, a video file, and a text file, and
in the generating of the visual data,
a format of the visual data is determined based on the external device information and the format information, and
the visual data is generated according to the determined format.

15. The method of claim 11, wherein the layout of the first user interface widget is stored in a memory of the device before the execution screen of the first user interface widget is displayed on the screen of the device.

16. The method of claim 15, wherein the generating of the visual data comprises mapping, to at least one object written in a Markup language, the layout of the first user interface widget and all or some of pieces of data associated with the layout.

17. The method of claim 11, further comprising determining the layout of the visual data based on the external device information and wherein the generating of the visual data is based on editing the execution screen of the first user interface widget, according to the determined layout.

18. A non-transitory computer-readable recording medium having embodied thereon a program which, when executed by a processor of a device, causes the device to perform operations comprising:
registering, as widget registration information, in a memory of the device, information for one or more user interface widgets, the widget registration information comprising first widget registration information for a first user interface widget of the one or more user interface widgets, the first widget registration information comprising external device information of an external device and format information for a format of visual data for displaying the first user interface widget by the external device;

establishing a communication connection, via a communicator of the device, with the external device;

generating visual data of the first user interface widget based on a layout of the first user interface widget and the format information, wherein the layout is used to display an execution screen of the first user interface widget on a screen of the device; and transmitting the generated visual data to the external device over the communication connection.

\* \* \* \* \*